(12) United States Patent
Tokushima et al.

(10) Patent No.: US 9,286,014 B2
(45) Date of Patent: Mar. 15, 2016

(54) INFORMATION PROCESSING APPARATUS AND RECORDING MEDIUM

(71) Applicants: Yuji Tokushima, Kanagawa (JP); Yoshinori Sochi, Tokyo (JP); Yosuke Aoki, Kanagawa (JP)

(72) Inventors: Yuji Tokushima, Kanagawa (JP); Yoshinori Sochi, Tokyo (JP); Yosuke Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/631,643

(22) Filed: Feb. 25, 2015

(65) Prior Publication Data

US 2015/0242174 A1    Aug. 27, 2015

(30) Foreign Application Priority Data

Feb. 26, 2014   (JP) .................................. 2014-035912
Feb. 13, 2015   (JP) .................................. 2015-026696

(51) Int. Cl.
| G06F 3/12 | (2006.01) |
| G06K 15/00 | (2006.01) |
| G06K 15/02 | (2006.01) |

(52) U.S. Cl.
CPC ............ *G06F 3/1258* (2013.01); *G06F 3/1207* (2013.01); *G06F 3/1275* (2013.01); *G06F 3/1294* (2013.01); *G06K 15/005* (2013.01); *G06K 15/1806* (2013.01); *G06K 15/1823* (2013.01)

(58) Field of Classification Search
None
See application file for complete search history.

(56) References Cited

U.S. PATENT DOCUMENTS 5,293,466 A * 3/1994 Bringmann ........... G06F 3/1206
                                                         358/1.13
2009/0279125 A1   11/2009 Liu et al.
2012/0287463 A1   11/2012 Iida

FOREIGN PATENT DOCUMENTS

| JP | 2009-271930 | 11/2009 |
| JP | 2012-238188 | 12/2012 |
| JP | 2013-088992 | 5/2013 |

* cited by examiner

*Primary Examiner* — Dov Popovici
(74) *Attorney, Agent, or Firm* — Duft Bornsen & Fettig LLP

(57) ABSTRACT

An information processing apparatus for creating drawing data based on a printing job, includes a plurality of drawing data creating units configured to create respective drawing data based on the printing job; a determining unit configured to determine, through an analysis of the printing job, a drawing data creating unit from the drawing data creating units to create a drawing datum based on the printing job; and a screen displaying unit configured to display, in respective manners, a content of the printing job with a plurality of display screens associated with the respective drawing data creating units, in a case where the determining unit fails to select any one of the drawing data creating units.

8 Claims, 26 Drawing Sheets

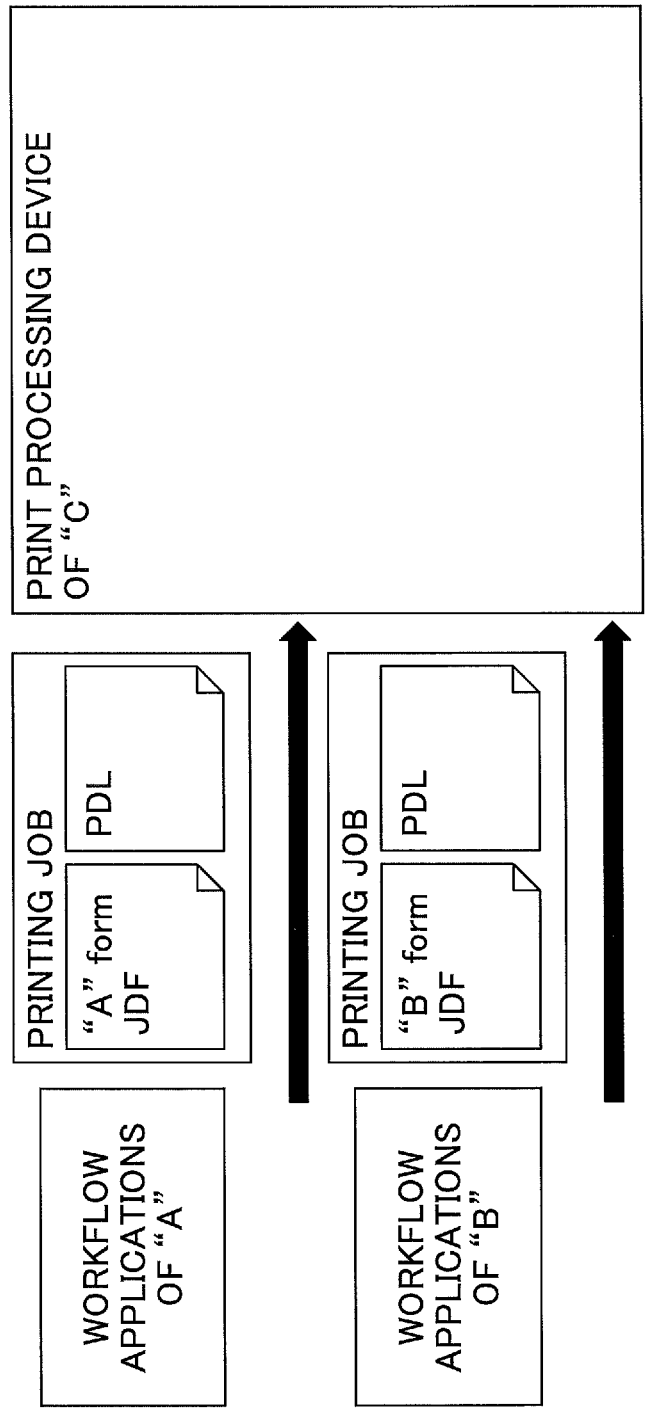

```
<JDFxmlns="http://www.CIP4.org/JDFSchema_1_1" xmlns:C="www.ccc.com/schema/ccc" ...>
  :
  <ResourceLinkPool>
    <ComponentLink ... Amount = "2" ... />
    :
  </ResourceLinkPool>
  <ResourcePool>
    <LayoutPreparationParams ... Rotate = "Rotate90" ... >
    :
    </LayoutPreparationParams>
  </ResourcePool>
  :
</JDF>
```

FIG.7A

```
<JDFxmlns="http://www.CIP4.org/JDFSchema_1_1" xmlns:A="www.aaa.com/schema/aaa" ...>
    :
  <ResourceLinkPool>
    <ComponentLink ... Amount = "2" ... />
    :
  </ResourceLinkPool>
  <ResourcePool>
    <LayoutPreparationParams ... A:Rotate = "2" ... >
    :
    </LayoutPreparationParams>
  </ResourcePool>
    :
</JDF>
```

```
<JDFxmlns="http://www.CIP4.org/JDFSchema_1_1" xmlns:B="www.bbb.com/schema/bbb" ...>
  <ResourceLinkPool>
    <ComponentLink ... B:DeliveryAmount = "2" ... />
    :
    :
  </ResourceLinkPool>
  <ResourcePool>
    <LayoutPreparationParams ...  B:AlternateRotation ="false"  ....  B:Rotate = "1" >
    :
    </LayoutPreparationParams>
    :
  </ResourcePool>
  :
</JDF>
```

FIG.8A

| "C" JDF | | Job Attribute in DFE | |
|---|---|---|---|
| NAME OF ATTRIBUTE | VALUE | NAME OF ITEM | VALUE |
| Amount | | Number of Print Copies | |
| | 1~32767 | | 1~32767 |
| Rotate | | Rotation | |
| | Rotate0 | | 0° |
| | Rotate90 | | 90° |
| | Rotate180 | | 180° |
| | Rotate270 | | 270° |
| ... | | ... | |
| | ... | | ... |
| | ... | | ... |

FIG.8B

| "A" JDF | | Job Attribute in DFE | |
|---|---|---|---|
| NAME OF ATTRIBUTE | VALUE | NAME OF ITEM | VALUE |
| A:Amount | | Number of Print Copies | |
| | 1~32767 | | 1~32767 |
| A:Rotate | | Rotation | |
| | 1 | | 0° |
| | 2 | | 90° |
| | 3 | | 180° |
| | 4 | | 270° |
| ... | | ... | |
| | ... | | ... |
| | ... | | ... |

FIG.8C

| "B" JDF | | Job Attribute in DFE | |
|---|---|---|---|
| NAME OF ATTRIBUTE | VALUE | NAME OF ITEM | VALUE |
| B:DeliveryAmount | | Number of Print Copies | |
| | 1~32767 | | 1~32767 |
| B:AlternateRotation | | Rotation | |
| | true | | |
| | false | | |
| B:Rotate | | | |
| | 1 | | 0° |
| | 2 | | 90° |
| | 3 | | 180° |
| | 4 | | 270° |
| ... | | ... | |
| | ... | | ... |
| | ... | | ... |

FIG.10

Job Attribute in DFE

| ITEM | | |
|---|---|---|
| Job Information | Number of Print Copies | |
| Edit Information | Direction Information | |
| | Print Side Information | |
| | Rotation | |
| | Expansion/Reduction | |
| | Position of Image | Offset |
| | | Position Adjusting Information |
| | Layout Information | Custom・Imposition |
| | | number of pages |
| | | Imposition Information |
| | | Page Oder Information |
| | | Creep position Adjustment |
| | Margin Information | |
| | Crop・Mark Information | Center・Crop・Mark Information |
| | | Corner・Crop・Mark Information |
| Finishing Information | Collate Information | |
| | Staple/Bind Information | |
| | Punch Information | |
| | Folding Information | |
| | Trim Information | |
| | Output Tray Information | |
| | Input Tray Information | |
| | Cover・Sheet Information | |
| RIP Control Mode (Page Mode or Sheet Mode) | | |

FIG.11

RIP Parameter List

| ITEM | | |
|---|---|---|
| Input/Output Data Type Information | | |
| Input/Output Data Read/Write position designation Information | | |
| Input/Output Data Read/Write position Information | | |
| Input/Output Data Read/Write Execution Mode | | |
| Measurement Unit Information (Dimension) | | |
| Input/Output Data Compression Method Information | | |
| RIP Control Mode | | |
| Input/Output Image Information Part | Information Related to Output Image | Image Format・Type |
| | | Image Format・Dimension |
| | | Image Format・Resolution |
| | | Position of Image |
| | | Color Separation Information |
| | | Color Plane・Fit・Policy Information |
| | | Plane Shift Information |
| | | Number of Bits in Image Format |
| | | Image Direction Information |
| | | Image Formation Position Information |
| | | Image Formation Size Information |
| | | Image Formation Method Information |
| | | Color ICC Information |
| | | Font Replacement Information |
| | | Image Formation Basic Point Information |
| | | Flat K Black Information |
| | | Rendering Information |
| | Information Related to Input Image | Image Format・Type |
| | | Image Format・Dimension |
| | | Image Format・Resolution |
| | | Position of Image |
| | | Input Data |
| | | Page Range Information |
| | | Color ICC Information |
| | Information Related to Operation of Image | Scaling・Offset Information |
| | | Object・Area Information |
| | | Halftone Information |
| | | Scaling・Algorithm Information |
| Information Related to PDL | Data Area | |
| | Size Information | |
| | Data Arrangement Method | |

FIG.14

EXAMPLE JDF OF "D"

```
<JDF-xmlns="http://www.CIP4.org/JDFSchema_1_1" xmlns:D="www.ddd.com/schema/ddd" ...>
    :
  <ResourcePool>
    <LayoutPreparationParams......>
      :
      D:NumberUp = "1 3"
      D:CustomCellOrder = "1 3 2"    (Page Order <Cell Order>)
      D:FoldCatalog = "F6-2"    (Folding in Three)
      :                                                :
    </LayoutPreparationParams>
      :                                                :
  </ResourcePool>
</JDF>
```

Page image        finishing image

Page image        finishing image

Page image        finishing image

INFORMATION PROCESSING APPARATUS AND RECORDING MEDIUM

CROSS-REFERENCE TO RELATED APPLICATIONS

This patent application is based on and claims priority pursuant to 35 U.S.C. §119(a) to Japanese Patent Application Nos. 2014-035912, filed on Feb. 26, 2014, and 2015-026696, filed on Feb. 13, 2015 and in the Japan Patent Office, the entire disclosures of which are hereby incorporated by reference herein.

BACKGROUND OF THE INVENTION

1. Field of the Invention

The present technology relates to an information processing apparatus creating drawing data based on a printing job, and the like.

2. Description of the Related Art

So called production printing that is of printing service, in which a lot of documents for business use are printed or bound, is known (for example, Japanese Laid-open Patent Publication No. 2012-238188). In the Japanese Laid-open Patent Publication No. 2012-238188, a printing system for informing a user whether a post process is available or not, in view of the whole system, is disclosed.

In the production printing, a printing process is usually handled as a workflow, and opening of a printing workflow is proceeded with. By opening the printing workflow, it is possible to describe setting files, or the like for printing jobs in important printing processes, etc., by common format, in software (workflow applications, described below), or printers of different manufacturers. A standard format referred to as a JDF (Job Definition Format) is known, as a format for describing all the processes of the printing workflow.

There are various processes in the printing workflow, such as a process for creating documents or contents, processes for designating printing methods, printing processes, post processes, or the like. Although these processes are performed by various workflow applications or printers, cooperation or printing process management can be achieved between printers by the JDF.

However, some workflow applications or printers may extend the format of the JDF. In this case, the JDF provided by the workflow applications of the different manufacturers may include a description in proprietary format.

FIG. 1A is an illustration diagram for illustrating an example of an inconvenience in accepting printing jobs by a print processing device of a manufacturer "C". Additionally, FIG. 1A and FIG. 1B shows an example of comparison, not an example of prior art. The print processing device of "C" receives printing jobs from workflow applications of a manufacturer "A" and a manufacturer "B". It may occur that the print processing device of "C" cannot analyze the JDF to process since the respective workflow applications extend the format of the JDF.

Therefore, in order to accept the printing jobs of the respective workflow applications, the print processing device of "C" may have a rendering engines 59 (hereinafter, referred to as RIP engines 59) capable of JDF conversion and handling respective workflow applications. In FIG. 1B, a JDF analyzing unit 56 analyzes the JDF to determine the manufacturer of the workflow application, and converts the setting information so as to be processed by the print processing device of "C". Also, the printing jobs can be processed to print with user's desired finished appearance, by installing the RIP engines 59 capable of handling respective workflow applications.

Thus, the print processing device of "C" can process the printing jobs to print with user's desired finished appearance, even if the respective workflow applications extend the format of the JDF.

By the way, a user may need to display or change contents of the printing jobs before rendering the printing jobs by the RIP engine. However, since settable attributes or settable range of values of the attributes may differ by respective RIP engines, the print processing device of "C" may not appropriately display the content of printing jobs of "A" or "B". Further, an instruction, to change the value of the attribute into a value which is valid only for the printing job of "B", may be accepted as an instruction for the printing job of "A".

An example of aggregation printing imposition will be described. In the workflow application of "A", only one of setting options for aggregation printing imposition of 2-up (2 pages are aggregated into 1 page)/4-up (4 pages are aggregated into 1 page)/9-up (9 pages are aggregated into 1 page)/16-up (16 pages are aggregated into 1 page) is acceptable, and the setting options are displayed as selectable options to accept one of the options. Meanwhile, in the workflow application of "B", the aggregation printing imposition can be set by using a format of "M (number of pages in longitudinal direction)×N (number of pages in lateral direction)", where any combinations are accepted as far as "M" and "N" are set within the respective limits.

In the workflow application of "C", the same setting screen as that of the workflow application of "A" is used. If the print processing device of "C" displays the printing job of "B", in a case where the aggregation printing imposition set as "M×N"="1×2", "2×2", "3×3", or "4×4" can be displayed respectively as 2-up, 4-up, 9-up, or 16-up. However, in a case where the combination of "M" and "N" is not one of the options shown above, the print processing device of "C" cannot appropriately display the setting information of the aggregation printing imposition.

To the contrary, a case, where the same setting screen as the workflow application of "B" is used in the workflow application of "C", will be described. In this case, the print processing device of "C" can display the printing jobs of 2-up, 4-up, 9-up, or 16-up, and accept an instruction to change into any one of the combinations of "M×N". However, in a case where the changed combination of "M×N" is neither "1×2" nor "M"="N", the rendering cannot be performed since the RIP engine of "A" does not support such an aggregation printing imposition.

RELATED ART DOCUMENT

Patent Document

[Patent Document 1]: Japanese Laid-open Patent Publication No. 2012-238188

SUMMARY OF THE INVENTION

An object of disclosure of the present technology is to provide an information processing apparatus capable of displaying setting contents of printing jobs.

The following configuration is adopted to achieve the aforementioned object.

In one aspect of the embodiment, an information processing apparatus, creating drawing data based on a printing job, includes a plurality of drawing data creating units configured to create respective drawing data based on the printing job; a determining unit configured to determine, through an analysis of the printing job, a drawing data creating unit from the drawing data creating units to create a drawing datum based on the printing job; and a screen displaying unit configured to display, in respective manners, a content of the printing job with a plurality of display screens associated with the respective drawing data creating units, in a case where the determining unit fails to select any one of the drawing data creating units.

Other objects, features and advantages of the present invention will become more apparent from the following detailed description when read in conjunction with the accompanying drawings.

BRIEF DESCRIPTION OF THE DRAWINGS

FIG. 1A is an illustration diagram for illustrating an example of an inconvenience in accepting printing jobs;

FIG. 7A shows an example of a part of the JDF;

FIG. 7B shows an example of the JDF and an extended definition;

FIG. 7C shows another example of the JDF and an extended definition;

FIG. 8A is an illustration diagram illustrating an example of a conversion table;

FIG. 8B is another illustration diagram illustrating an example of a conversion table;

FIG. 8C is another illustration diagram illustrating an example of a conversion table;

FIG. 10 is an illustration diagram illustrating an example of the "Job Attribute in DFE";

FIG. 11 is an illustration diagram illustrating an example of the "RIP Parameter List";

FIG. 14 is an illustration diagram illustrating an example of the JDF;

DETAILED DESCRIPTION OF THE PREFERRED EMBODIMENTS

Herein below, embodiments will be described with reference to accompanying drawings.

First Embodiment

Description of the Present Embodiment in Setting Screen for Printing Jobs

Figure 1B:
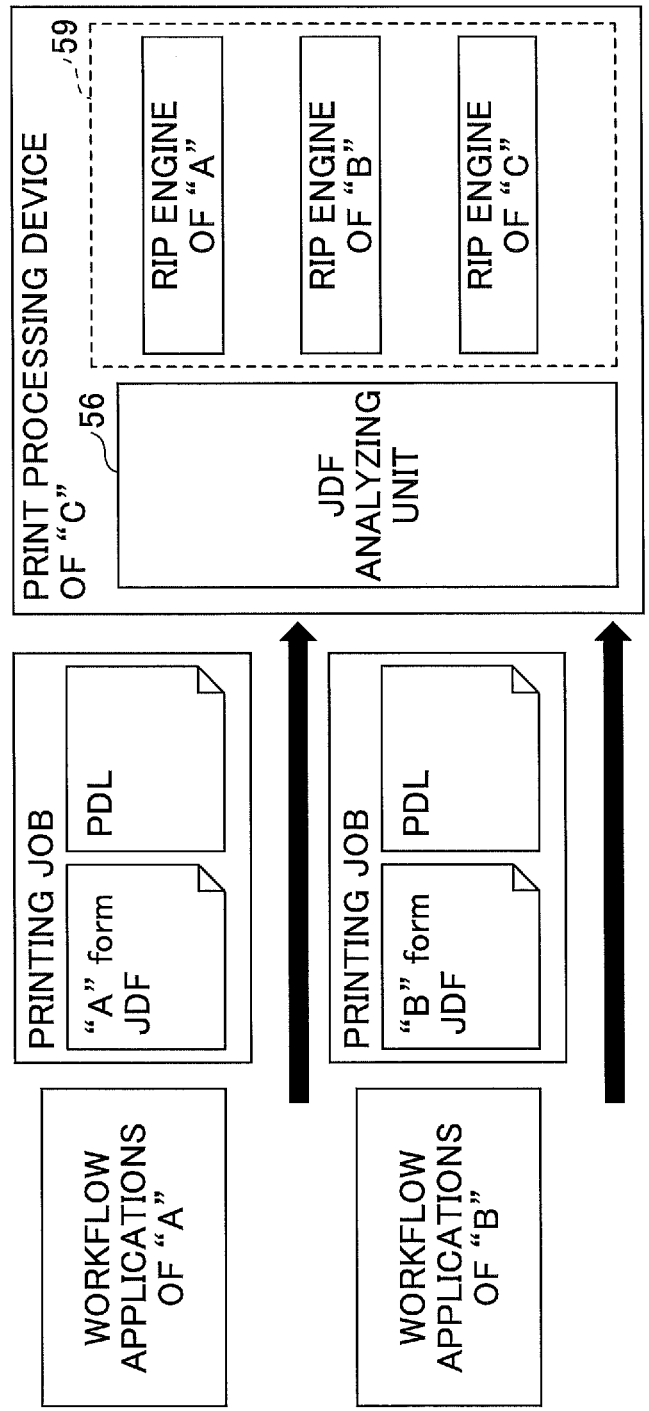
FIG. 1B is another illustration diagram for illustrating an example of an inconvenience in accepting printing jobs.
Figure 2:
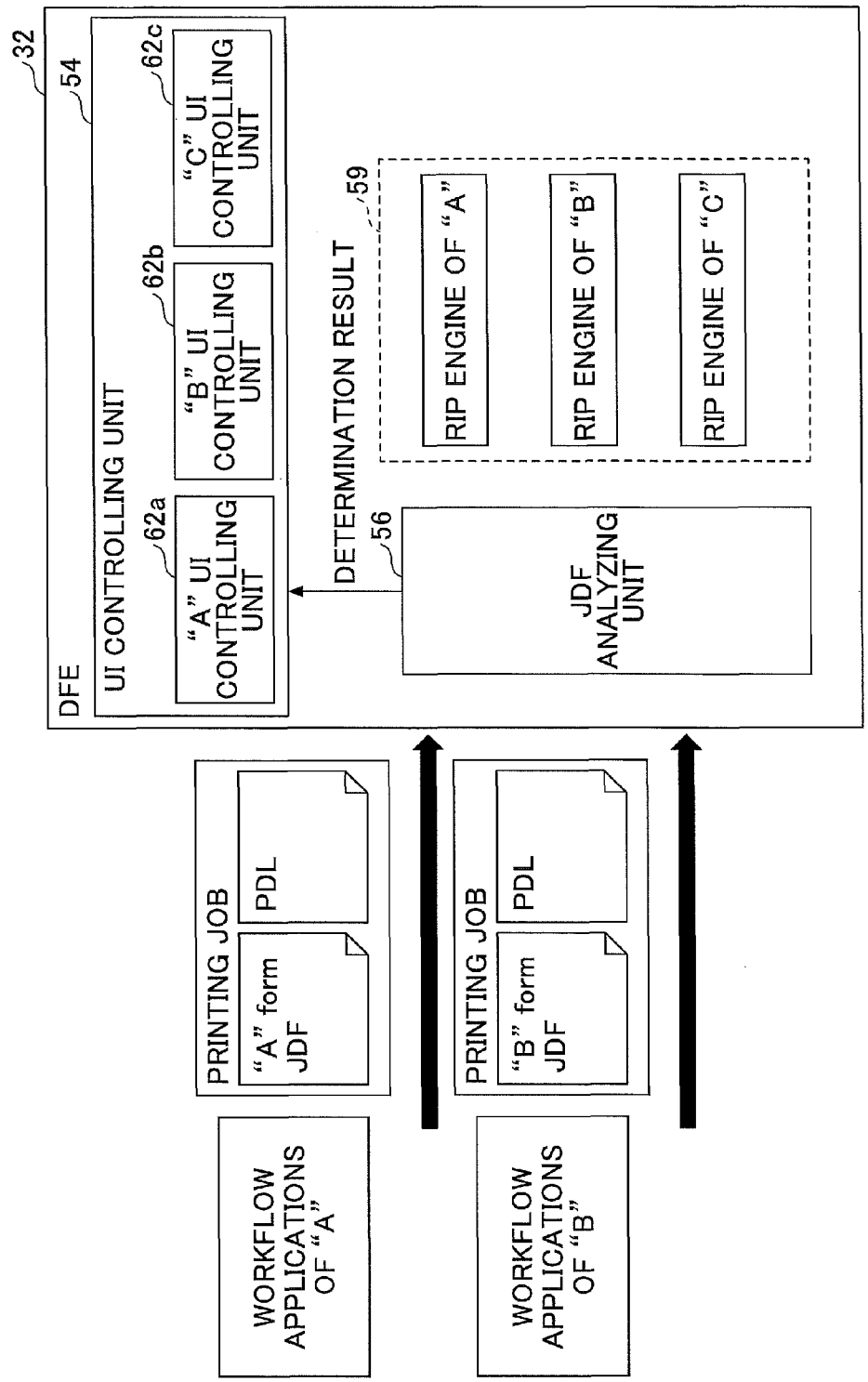
FIG. 2 is an illustration diagram illustrating an example of a setting screen for printing jobs of a DFE.

FIG. 2 is an illustration diagram illustrating an example of setting screen for printing jobs of a DFE of the present embodiment. The DFE (Digital Front End) 32 in FIG. 2 corresponds to a print processing device. The DFE 32 of a manufacturer "C" includes a JDF (Job Definition Format) analyzing unit 56 for converting the JDFs respectively created by workflow applications of a manufacturer "A", a manufacturer "B", and the manufacturer "C" into setting information ("Job Attribute in DFE" described later), which can be handled by the DFE 32 of "C". Also, the DFE 32 includes a RIP engine 59 of "A", a RIP engine 59 of "B", and a RIP engine 59 of "C".

Each RIP engine 59 is capable of rendering a printing job (rendering an image) created for the RIP engine 59 (that is, being able to process the printing job). Therefore, the printing jobs created by the workflow application of "A" are expected to be rendered by the RIP engine 59 of "A", the printing jobs created by the workflow application of "B" are expected to be rendered by the RIP engine 59 of "B", and the printing jobs created by the workflow application of "C" are expected to be rendered by the RIP engine 59 of "C". Additionally, here, the workflow application or the RIP engine 59 of "X (means any names of manufacturers)" means not only a workflow application or a RIP engine 59 created by a manufacturer "X" but also a workflow application or a RIP engine 59 created for a product of the manufacturer "X".

A UI controlling unit 54 for displaying a setting screen for the printing jobs (an example of a display screen in the claims) includes UI controlling units (hereinafter referred to as a "A" UI controlling unit 62a, a "B" UI controlling unit 62b, and a "C" UI controlling unit 62c) for the respective manufacturers, corresponding to the respective RIP engines 59. "A" UI controlling unit 62a displays a setting screen for the printing jobs created by the workflow application of "A", "B" UI controlling unit 62b displays a setting screen for the printing jobs created by the workflow application of "B", and "C" UI controlling unit 62c displays a setting screen for the printing jobs created by the workflow application of "C".

A JDF analyzing unit 56 analyzes the JDF included in the printing job to determine the manufacturer (or the RIP engine) of a workflow application which has created the printing job. In the UI controlling unit 54, receiving the determination result, any one of the "A" UI controlling unit 62a, the "B" UI controlling unit 62b, and the "C" UI controlling unit 62c displays own setting screen for the printing job.

The DFE 32 can appropriately display setting contents of the printing jobs (display attributes and values thereof, described in the JDF by the workflow applications, in a manner required by the respective workflow applications) respectively created by the workflow applications, by displaying the setting screens for the printing jobs corresponding to the respective RIP engines 59. Further, in a case where the "A" UI controlling unit 62a, the "B" UI controlling unit 62b, or the "C" UI controlling unit 62c accepts an instruction to change the content of the printing job, it is prevented that the RIP engines 59 fail to render the printing job since the RIP engine 59 of "A", the RIP engine 59 of "B", and the RIP engine 59 of "C" respectively accept only settings of the printing job which can be processed to render by themselves.

In FIG. 2, it is assumed that the RIP engine 59 can be specified through the analysis of the JDF. However, in a workflow, a JDF of a printing job described in a format incompatible with the DFE 32 of "C", or an unknown JDF may be received by the DFE 32. In this case, it is difficult for the JDF analyzing unit 56 to determine an appropriate RIP engine 59, then it cannot be determined which one of the "A" UI controlling unit 62a, the "B" UI controlling unit 62b, or the "C" UI controlling unit 62c shall display the setting screen.

It may be conceivable that the "A" UI controlling unit 62a and the RIP engine 59 of "A", for example, are fixed to be selected when the incompatible JDF or the unknown JDF is received. However, depending on the printing job, when using the setting screen of "B" or "C" and the RIP engine 59 of "B" or "C", a better finished appearance may be obtained.

Therefore, in the present embodiment, in a case where a printing job of an incompatible JDF or an unknown JDF is received, the content of the printing job can be displayed with the setting screens of all of the workflow applications (of "A", "B", and "C").

Figure 3:
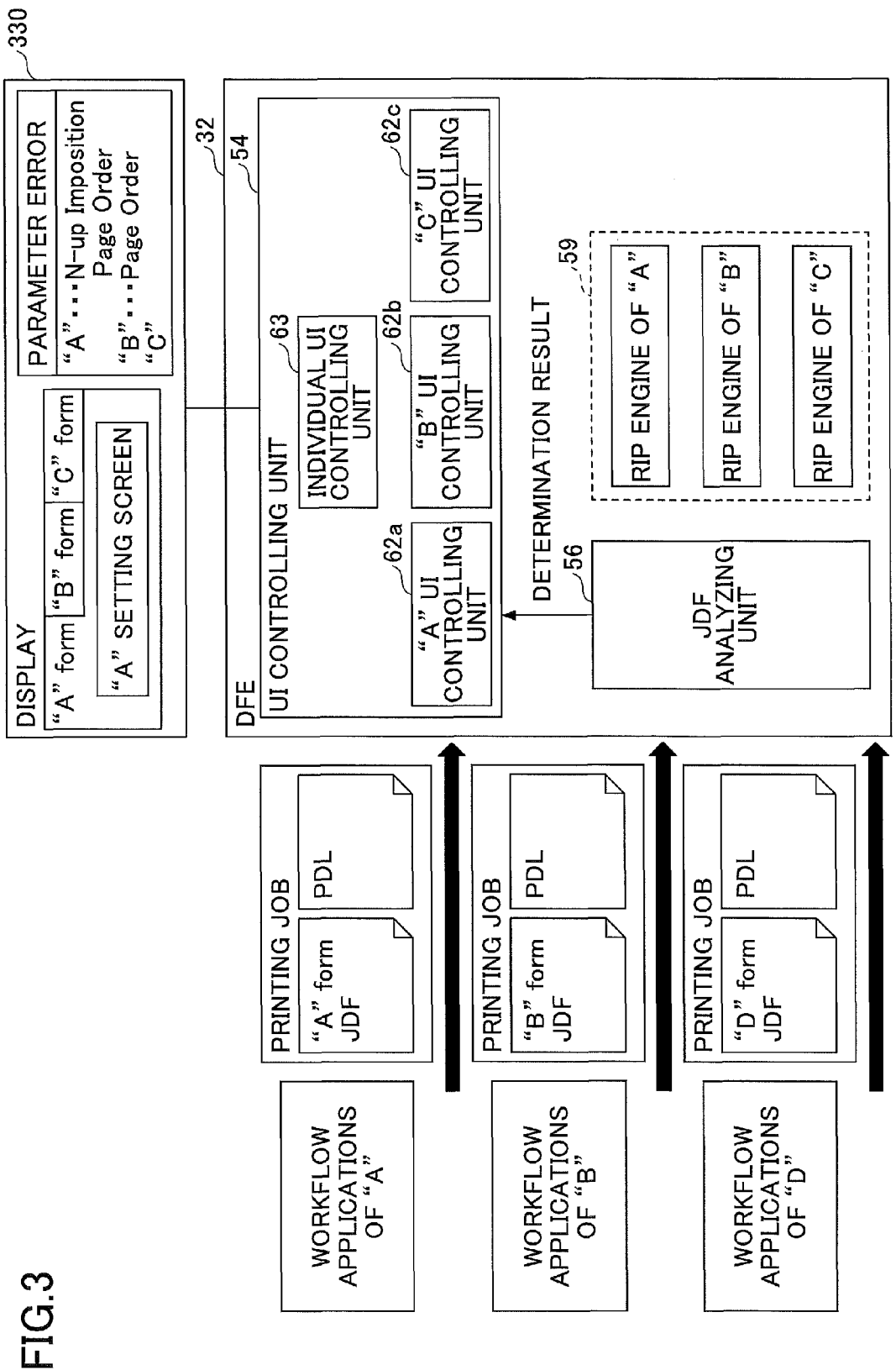
FIG. 3 is an illustration diagram illustrating an example setting screen supporting an incompatible JDF or an unknown JDF.

FIG. 3 is an illustration diagram, illustrating the display of the setting screen for printing jobs which supports the printing jobs of the incompatible JDF or the unknown JDF. The UI controlling unit 54 includes an individual UI controlling unit 63. The individual UI controlling unit 63 displays setting screens of the respective manufacturers, when receiving the printing job of the incompatible JDF or unknown JDF, on a display 330. A user controls the setting screen so as to change the displayed screen, for example, operating tabs or the like, because of the limited size of the display 330. The setting screens of the respective manufacturers are the same as those respectively displayed by the "A" UI controlling unit 62a, the "B" UI controlling unit 62b, and the "C" UI controlling unit 62c.

In the setting screens of the respective manufacturers, some of the attributes described in the incompatible JDF or the unknown JDF cannot be displayed appropriately. In this case, the individual UI controlling unit 63 displays the attributes or the values thereof included in the JDF, which cannot be displayed in the setting screen or which are changed, as error information (an example of setting difficulty information in the claims). In the example of FIG. 3, in the JDF of "D", page order and N-up imposition (setting for aggregation printing imposition) cannot be displayed appropriately by the setting screen of "A". Also, in the JDF of "D", the page order cannot be displayed appropriately by the setting screen of "B". Meanwhile the JDF of "D" can be displayed appropriately by the setting screen of "C". Therefore, the user can predict how the respective RIP engines 59 perform rendering.

Further, the individual UI controlling unit 63 can display finished appearances by the respective RIP engines 59 as preview screens. Therefore, through the preview screen, the user can also determine whether a desired printing result is obtained.

[Example Configuration]

Figure 4:
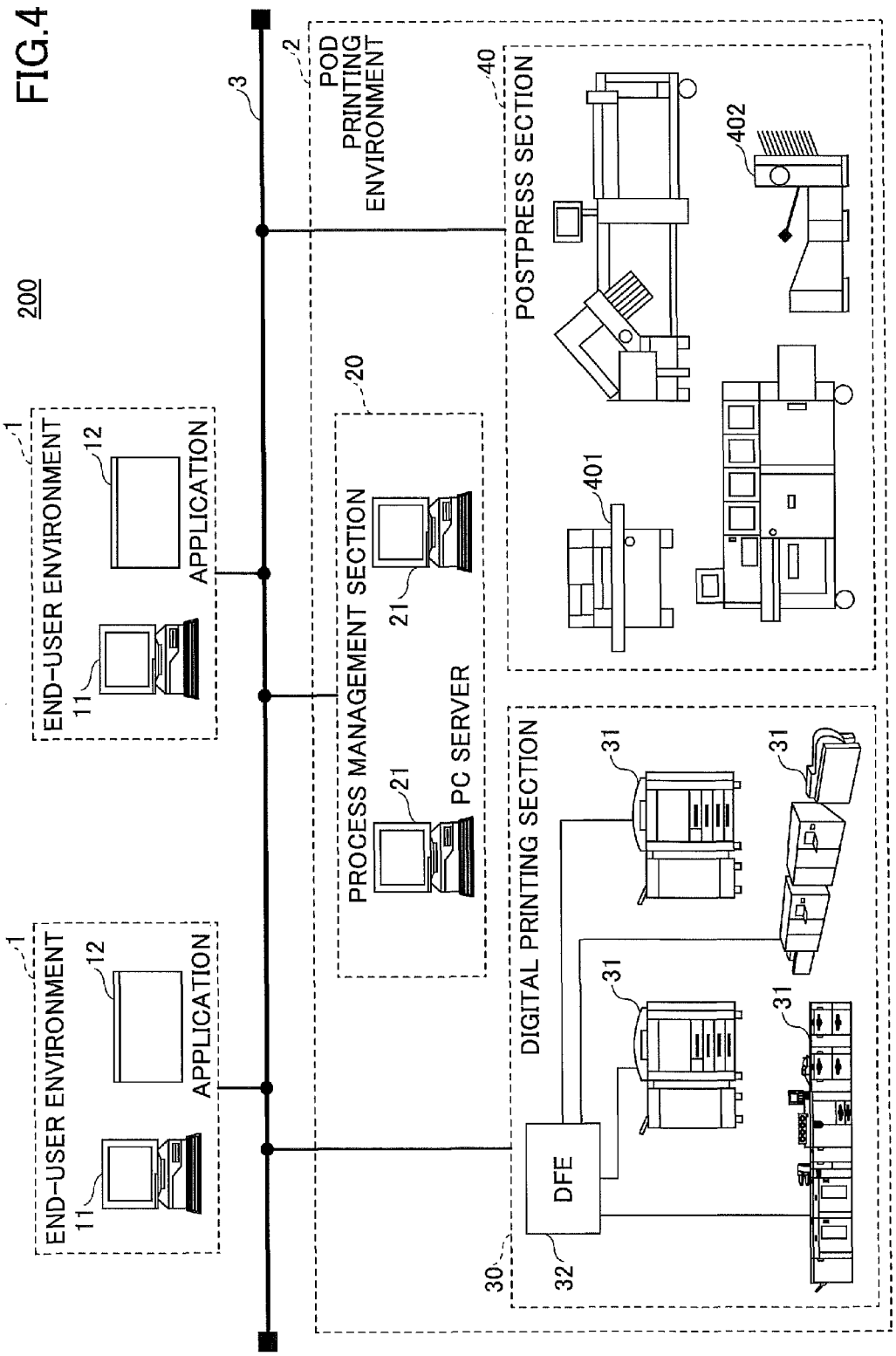
FIG. 4 is a schematic diagram illustrating an example of the whole structure of a print system.

FIG. 4 is a schematic diagram illustrating an example of the whole structure of a print system 200 of the present embodiment. The print system of the present embodiment includes one or more end-user environments 1 and a POD (Print On Demand) printing environment 2, which are connected with each other through a network 3 such as a LAN or the Internet.

In the end-user environment 1, a client PC 11 is disposed. A workflow application (hereinafter simply referred to as an application) 12 for a POD printing operation is installed in the client PC 11, and the client PC 11 creates printing jobs accepting user operations.

The application 12 includes a function of an aggregation printing imposition (number up imposing function) for imposing a plurality of logical page images on a surface of a printing sheet, and a function of image editing for adding header, footer, or page number. Also, the application 12 outputs instructions such as punching or stapling for print bookbinding. Such instructions or settings are described in the JDF. The JDF may be referred to as a job ticket, or a print instruction.

The POD printing environment 2 includes a process management section 20, a digital printing section 30 and a postpress section 40, which are connected with each other through the network 3. In the POD printing environment 2, the process management section 20 instructs the digital printing section 30 and the postpress section 40 to operate, and consolidates the workflow of the POD printing environment 2.

The process management section 20 receives the printing jobs (JDF and PDL) from the end-user environment 1, and saves the printing jobs. Here, the JDF is an example of the setting information in the claims, while PDL is an example of the printing data in the claims. Although PDL is a language for specifying how to draw a page image (rasterized image), in the present specification the PDL means data described in the PDL. The PDL includes PDF (Portable Document Format), PostScript, PCL, RPDL, and the like.

Also, the process management section 20 assembles operations in the respective processes in a workflow, based on the printing jobs from the end-user environment 1, or schedules operations of the digital printing section 30, the postpress section 40, or the operators so as to be effectively performed. Further, the process management section 20 informs the operators of error occurrences, if needed. Generally, the process management section 20 is configured to include one or more PC servers 21.

The process management section 20 sends the printing jobs to the digital printing section 30 to let the digital printing section 30 print them. Further, printed documents are sent to the postpress section 40, and the postpress section 40 performs bookbinding, or the like, based on the instructions from the process management section 20. Additionally, the digital printing section 30 may directly send the printing jobs to the postpress section 40.

The digital printing section 30 is configured to include various printers 31 (printer devices such as printers for production printing, high speed color inkjet printers, and color/monochrome MFPs) 31. In the digital printing section 30, the DFE 32 is disposed. The DFE 32, also referred to as a print processing device, controls printing by the printers 31. As shown in FIG. 4, the DFE may be separately disposed from the printers 31, or may be included in the printers 31. When receiving the printing job from the process management section 20, the DFE 32 generates raster data (an example of drawing data in the claims), using the JDF and the PDL, and sends it to the printer 31 for printer 31 to form an image by toner or ink.

The digital printing section 30 includes various printers 31. Additionally, the digital printing section 30 may include a printer 31 directly connected with a finisher (post processing device) which performs post processes such as sheet folding, saddle stitching, binding a book by enfolding inner sheets with a cover sheet, and punching on the printed papers.

The postpress section 40 is configured to include, according to instructions for the printed documents (postpress jobs) operations from the process management section 20, post processing devices such as a sheet folder, a saddle stitching binder, an enfolding binder, a sheet cutter, a sheet enclosing machine, or a sheet mounting machine. Further, the postpress section 40 performs finishing processes such as sheet folding, saddle stitching, binding a book by enfolding inner sheets with a cover sheet, cutting, enclosing, or mounting on the printed papers output from the digital printing section 30. The postpress section 40 includes post processing devices for performing work after digital printing (post process), such as a stapler 401 and a puncher 402.

An end-user of the end-user environment 1 edits, imposes, inserts text, or instructs performing the post process by using the application 12 for POD printing operations installed in the client PC 11, and sends the printing jobs to the process management section 20 of the POD printing environment 2.

The PC server 21 of the process management section 20, according to the JDF, instructs the digital printing section 30 to print, and instructs the postpress section 40 to perform post processes.

[Hardware Configuration]

In the present embodiment, the printing jobs created by the end-user environment 1 are received by the process management section 20, and the process management section 20 sends the printing jobs to the DFE 32. The functions of the DFE 32 may be performed by a device in the network instead of the DFE 32. In the present embodiment, the DFE 32 determines the application 12 which has created the printing job, and displays the content of the printing job.

Figure 5:
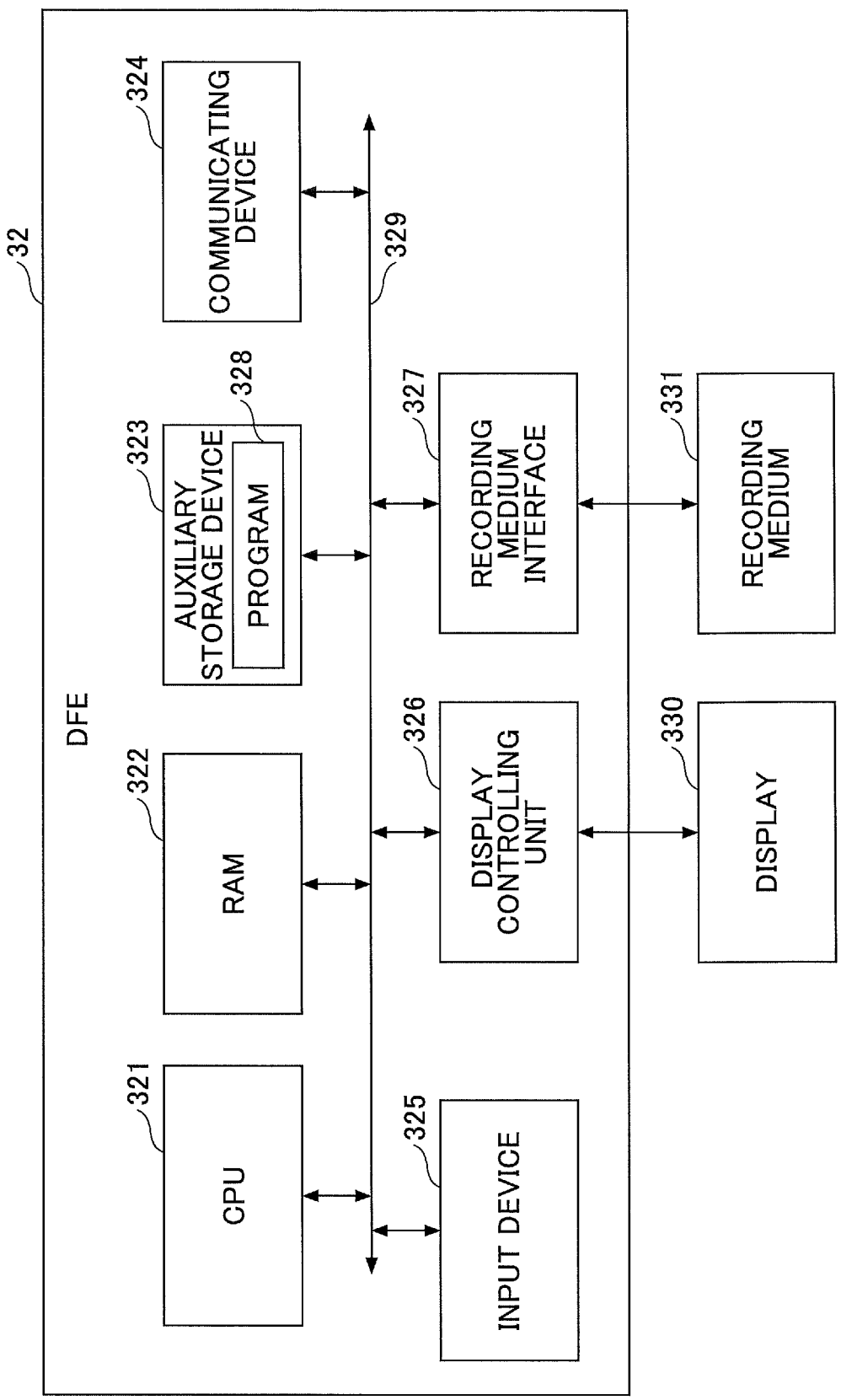
FIG. 5 is a block diagram illustrating an example of a hardware configuration of the DFE.

FIG. 5 is a block diagram illustrating an example of a hardware configuration of the DFE 32. For example, the DFE 32 has the hardware configuration shown in FIG. 5. That is, the DFE 32 includes a function to serve as an information processing device (computer). DFE 32 includes a CPU 321, a RAM 322, an auxiliary storage device 323, a communicating device 324, an input device 325, a display controlling unit 326 and a recording medium interface 327, which are connected with each other through a bus 329.

The CPU 321 controls the entire DFE 32 by executing programs using the RAM 322 as a work memory. The auxiliary storage device 323 is a nonvolatile memory such as a HDD (Hard Disk Drive), or an SDD (Solid State Drive). The auxiliary storage device 323 stores a program 328 capable of converting the printing job.

The communicating device 324 is a modem, a LAN card, or the like, to communicate with the end-user environment 1, the process management section 20, or the postpress section 40, by connecting to the network 3. Also, the communicating device 324 communicates with the printer 31. The input device 325 is a keyboard, a mouse, or the like, accepting the user's operations. The display control device 326, being connected with the display 330, displays screens on the display 330 under control of the CPU 321. Additionally, the display 330 may include a touch screen.

The recording medium interface 327 writes data on the recording medium 331, and reads data from the recording medium 331 under control of the CPU 321, where a portable recording medium is detachably attached to the recording medium interface 327. The recording medium 331 is an optical, an electrical, or a magnetic recording medium, such as a CD-ROM, an optical disk, a USB memory or an SD card; or another semiconductor memory, which records data electrically, such as flash memory. Various types of memory can be used as the recording medium 331.

Additionally, the program 328 is distributed being stored in the recording medium 331, or distributed by being downloaded from a server (not shown) through the network 3.

Also, the client PC 11 in the end-user environment 1 and the PC server 21 in the process management section 20 respectively have hardware configurations similar to that of FIG. 5.

[Function of DFE]

Figure 6:
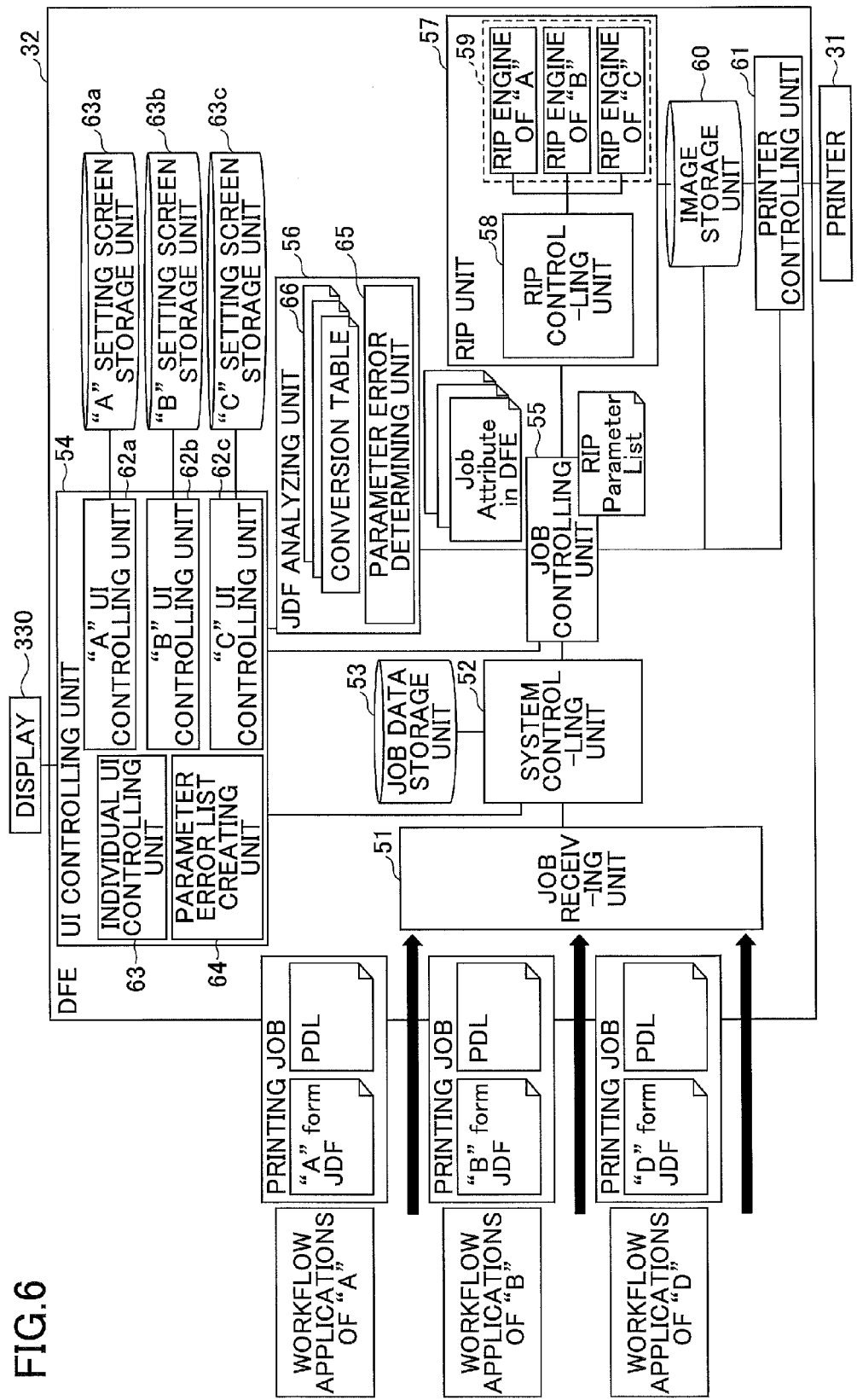
FIG. 6 is a block diagram illustrating an example of a functional configuration of the DFE.

FIG. 6 is a block diagram illustrating an example of a functional configuration of the DFE 32. The DFE 32 performs job controlling, RIP controlling, or printer controlling, in a print workflow. Thus, the DFE 32 serves as a server that provides the end-user environment 1 and the process management section 20 with important functions of printing.

Additionally, the job controlling means a control of a series of printing job processes, such as accepting the printing job, analyzing the JDF, creating raster data, printing by the printers 31, and the like. The RIP controlling means control of the RIP engines 59 to create the raster data by creating a "RIP Parameter List" after creating "Job Attributes in DFE" described later. RIP stands for "Raster Image Processor", and means a specific IC for creating the raster data, or a creation of the raster data itself. The printer controlling means a control of the printers 31 to print by sending the printers 31 the raster data and a part of the "Job Attributes in DFE" ("Finishing Information" described later).

The DFE 32 includes a job receiving unit 51, a system controlling unit 52, a UI controlling unit 54, a job controlling unit 55, a JDF analyzing unit 56, a RIP unit 57, a RIP controlling unit 58, RIP engines 59, and a printer controlling unit 61. Functions of these units are achieved by executing the program 328 by the CPU 321 in cooperation with various hardware resources which include hardware shown in FIG. 5. Further, the DFE 32 includes a job data storage unit 53 and an image storage unit 60, which are included in the configurations of auxiliary storage device 323, the RAM 322, the recording medium 331, or the like.

The job receiving unit 51 receives the printing jobs from the application 12, or the like, through the network 3. The job receiving unit 51 records, for example, unique job numbers, received dates, finished dates, statuses, etc., as log information respectively associated with the printing jobs. The printing jobs may be input from a USB memory, etc., instead of input from the application 12. Although the JDF is included in the printing job of the present embodiment, in a case where the JDF is not included in the printing job, the job receiving unit 51 creates a dummy JDF to enable the rendering.

The system controlling unit 52 stores the received printing jobs in the job data storage unit 53, or outputs them to the job controlling unit 55. For example, in a case where the JDF 32 is set, in advance, to store the printing jobs in the job data storage unit 53, the system controlling unit 52 stores the printing jobs in the job data storage unit 53. Also, for example, in a case where a description on whether storing the job in the job data storage unit 53 is included in the JDF, the DFE 32 follows the description.

Further, for example, in a case where a user operation for displaying on the display 330 is given, the system controlling unit 52 outputs the contents of the printing jobs stored in the job data storage unit 53 to the UI controlling unit 54. The UI controlling unit 54, outputting the JDF to the JDF analyzing unit 56, receives the determination result of for which RIP engine 59 the JDF is created (by which application 12 the JDF has been created), thereby controlling any one of the "A" UI controlling unit 62a, the "B" UI controlling unit 62b, or the "C" UI controlling unit 62c to display the JDF with the setting screen for printing. Thus, the contents of the printing jobs are displayed.

The job data storage unit 53 is a storage area for storing such printing jobs, included in the auxiliary storage device 32 or the recording medium 331. The job data storage unit 53 may be included in a storage device in the network (not shown).

When receiving the instructions to execute the printing jobs from the user, the end-user environment 1, or the process management section 20, the system controlling unit 52 outputs the printing jobs stored in the job data storage unit 53 to the job controlling unit 55. Also, for example, in a case where a time to print is described in the JDF, the system controlling unit 52 outputs the printing jobs stored in the job data storage unit 53 to the job controlling unit 55, at the described time.

The UI controlling unit 54, as described above, displays the content (may include, other than JDF, bibliographic data such as a requester of the printing job or a request date) of the printing job on the display 330. Further, the UI controlling unit 54 displays the raster data, created by the RIP engines 59, on the display 330.

The UI controlling unit 54 includes the "A" UI controlling unit 62a, the "B" UI controlling unit 62b, the "C" UI controlling unit 62c, the individual UI controlling unit 63, and a parameter error list creating unit 64.

The "A" UI controlling unit 62a includes an "A" setting screen storage unit 63a, the "B" UI controlling unit 62b includes a "B" setting screen storage unit 63b, and the "C" UI controlling unit 62c includes a "C" setting screen storage unit 63c. The "A" setting screen storage unit 63a stores a setting screen for displaying the attributes of the JDF created for the RIP engine 59 of "A" by the application 12, in a manner required by the application 12, and for accepting the setting of the values of the attributes with which the RIP engine 59 of "A" can perform the rendering. The "B" setting screen storage unit 63b stores a setting screen for displaying the attributes of the JDF created for the RIP engine 59 of "B" by the application 12, in a manner required by the application 12, and for accepting the setting of the values of the attributes with which the RIP engine 59 of "B" can perform the rendering. The "C" setting screen storage unit 63c stores a setting screen for displaying the attributes of the JDF created for the RIP engine 59 of "C" by the application 12, in a manner required by the application 12, and for accepting the setting of the values of the attributes with which the RIP engine 59 of "C" can perform the rendering.

When the user change the JDF, the "A" UI controlling unit 62a, the "B" UI controlling unit 62b, or the "C" UI controlling unit 62c accepts the change, and the system controlling unit 52 stores again the changed JDF in the job data storage unit 53.

In a case where the JDF analyzing unit 56 cannot determine a RIP engine 59 for which the JDF has been created (in a case where it is determined that a parameter error has occurred, described later), the individual controlling unit 63 displays the JDF with all the setting screens of "A", "B", and "C".

The parameter error list creating unit 64 creates and displays a parameter error information screen (described later) based on the parameter error information output from the JDF analyzing unit 56.

The job controlling unit 55 controls the RIP controlling unit 58 to create the raster data, and controls the printer controlling unit 61 to print. Specifically, the job controlling unit 55 first sends the JDF of the printing job to the JDF analyzing unit 56, while outputting a JDF conversion request to the JDF analyzing unit 56.

The JDF analyzing unit 56 receives the JDF and the JDF conversion request from the job controlling unit 55. Then, the JDF analyzing unit 56 analyzes the description of the JDF to determine the manufacturer of the application 12 which has created the JDF. To determine the manufacturer of the application 12 which has created the JDF is equivalent to determining the RIP engine 59 which is expected to perform rendering of the printing job.

The JDF analyzing unit 56 converts the JDF into the "Job Attribute in DFE" which can be handled by the DFE 32, by using a conversion table 66 prepared for the respective manufacturers. That is, in a case where the DFE 32 is created by the manufacturer "C", the JDF created by the application of not only manufacturer "C" but also manufacture "A" or "B" is converted into the "Job Attribute in DFE" which can be handled by the DFE 32 of "C".

Also, when receiving the JDF and a determination request of the RIP engine 59 from the UI controlling unit 54, the JDF analyzing unit 56 determines the RIP engine 59 expected to perform rendering based on the JDF, and reports it to the UI controlling unit 54. In a case where the JDF analyzing unit 56 cannot determine a RIP engine 59, the JDF analyzing unit 56 reports "unknown" as the determination result.

Further, the JDF analyzing unit 56 includes a parameter error determining unit 65. The parameter error determining unit 65 creates parameter error information and sends it to the UI controlling unit 54. The parameter error information indicates the attributes and values thereof having been omitted corresponding to the respective RIP engines 59.

Additionally, when creating the "Job Attribute in DFE", the JDF analyzing unit 56 sets a "RIP Control Mode" in the "Job Attribute in DFE". The "RIP Control Mode" includes a "Page Mode" and a "Sheet Mode" (described later). It is researched in advance to know that with "Page Mode" or "Sheet Mode", the respective manufacturer creates the printing job. Therefore, if the manufacturer of the workflow application having created the JDF is determined, the "RIP Control Mode" can be determined too. In the present embodiment, the DFE 32 expects to use the "Page Mode" in aggregation printing imposition setting ("Page Mode" is the default mode).

As described above, the job controlling unit 55, receiving the "Job Attribute in DFE", converts the "Job Attribute in DFE" and the PDL into the "RIP Parameter List", and outputs the printing job in a form of the "RIP Parameter List" to the RIP controlling unit 58. The "RIP Parameter List" is a group of information for performing RIP process. The job controlling unit 55 determines commands of RIP process to be provided to the RIP engine 59. The commands are referred to as RIP commands.

The "RIP Parameter List" includes a "RIP control mode". The RIP controlling unit 58 controls the RIP engines 59 with reference to the "RIP control mode". Therefore, a sequence is determined based on the "RIP control mode".

"Page Mode". In this mode, an instruction for RIP processing is given page by page, and the raster data, in which the pages are aggregated into one sheet, is created.

"Sheet Mode". In this mode, a plurality of pages are aggregated into one sheet in advance, and an instruction for RIP processing is given part by part (respectively corresponding to pages before being aggregated) of the sheet, thereby creating the raster data.

The RIP unit 57 includes the RIP controlling unit 58 and the RIP engines 59, and creates the raster data by using these units. The RIP controlling unit 58 analyzes information in the "RIP Parameter List" thereby determining the RIP engine 59 to be used. The RIP engine 59 is determined based on one or more items in the "RIP Parameter List" or based on identification information indicated on the "RIP Parameter List". For example, the RIP engine 59 is determined based on a description in the "RIP Parameter List", such as "xmlns: A="www.aaa.com/schema/aaa"", or "xmlns: B="www.bbb.com/schema/bbb"" (See the description of the JDF). Or, for example, when the job controlling unit 55 indicates RIP engine identification information in the "RIP Parameter List", the RIP engine 59 identified by the RIP engine identification information is selected. The RIP controlling unit 58 sends RIP commands to the selected RIP engine 59 with reference to the "RIP Parameter List".

The RIP controlling unit 58, with reference to the "RIP Parameter List", in a case where the "RIP control Mode" is the "Sheet Mode", outputs RIP commands according to the "Sheet Mode". Thus, the differences in the printing jobs are absorbed.

The RIP engines 59 are rendering engines for creating the raster data by rasterizing according to the RIP commands.

The image storage unit 60 is a storage means for storing the created raster data. For example, the image storage unit 60 is included in the auxiliary storage device 323. Also, the image storage unit 60 may be included in a storage device in the network.

The printer controlling unit 61, being connected with the printer 31, retrieves the raster data stored in the image storage unit 60, and sends it to the printer 31, and thereby performs printing. Also, the finishing processes are performed based on the "Finishing Information" received from the job controlling unit 55.

[JDF and Determination of Manufacturer of Application Having Created JDF]

The JDF is described in XML (Extensible Markup Language). The XML is a standard of structured text for structuring a document using tags which have specific meanings.

FIGS. 7A, 7B, and 7C are illustration diagrams respectively illustrating examples of a part of the description in the JDF. FIG. 7A shows an example of a part of the JDF created by the application 12 of "C". Instructions on the printing job are described in the JDF.

"JDF xmlns="http://www.CIP4.org/JDFSchema_1_1"" indicates that the JDF ticket is in compliance with CIP4.

"xmlns:C="www.ccc.com/schema/ccc"" indicates tag definition not in compliance with CIP4, that has been independently extended by a print business operator/Vender. In this example, tags started with "C:" are all extended tags.

"ResourcePool" indicates a definition of a group of the attributes to perform printing.

"LayoutPreparationParams" is one of the attributes defined by the "ResourcePool", defining attributes related to the imposition.

"ResourceLinkPool" indicates the definition of a group of references to attributes in the "ResourcePool", where the attributes are commonly used within a specific range in the job, such as a range between pages, in which different attributes are used, or the like.

"ComponentLink" is a definition of a reference in the "ResourceLinkPool", indicating reference to the attributes related to output subjects and information thereof.

"Amount" indicates number of print copies.

"Rotate" indicates a rotation angle of the image.

FIG. 7B shows an example of the JDF and an extended definition of "A". FIG. 7C shows an example of the JDF and an extended definition of "B". In FIG. 7B "xmlns: A="www.aaa.com/schema/aaa"" indicates that tags in the JDF starting with "A:" are all extended tags of "A". In FIG. 7C "xmlns:B="www.bbb.com/schema/bbb"" indicates that tags in the JDF starting with "B:" are all extended tags of "B".

Therefore, the JDF analyzing unit 56 can determine the manufacturer of the application 12 having created the JDF (RIP engine 59) with reference to such description in the JDF. The JDF can be converted into the "Job Attribute in DFE" which can be handled by the DFE 32 of "C", using a conversion table (described later), corresponding to the manufacturer of the application 12.

Also, in a case where the JDF is received from the UI controlling unit 54, which of the RIP engines 59 is determined with reference to extended tags.

[Creation of Job Attribute in DFE]

Figure 9A:
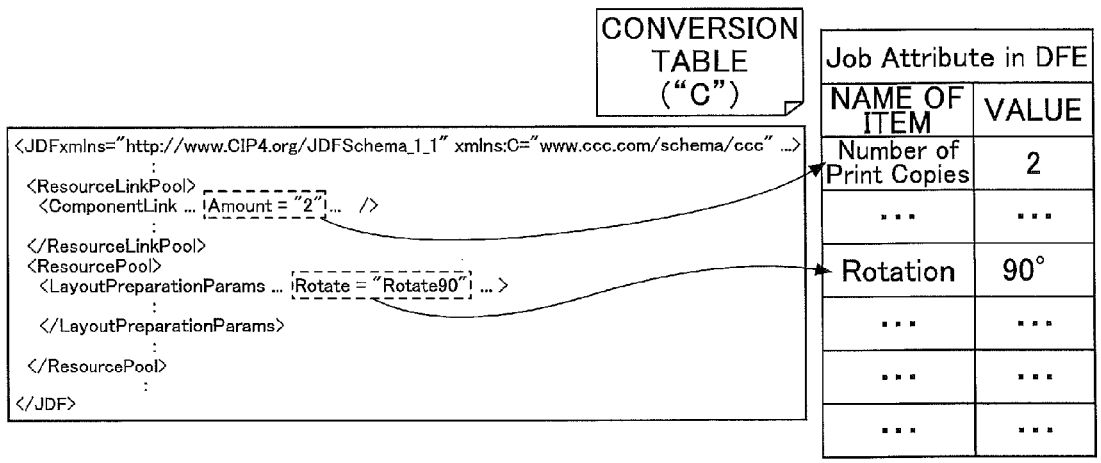
FIG. 9A is an illustration diagram illustrating creation of a "Job Attribute in DFE"
Figure 9B:
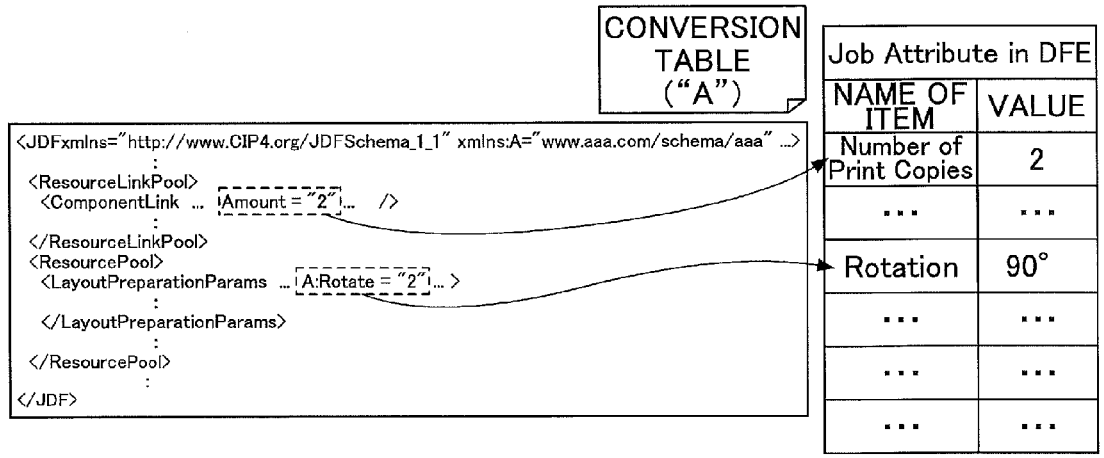
FIG. 9B is another illustration diagram illustrating creation of a "Job Attribute in DFE"
Figure 9C:
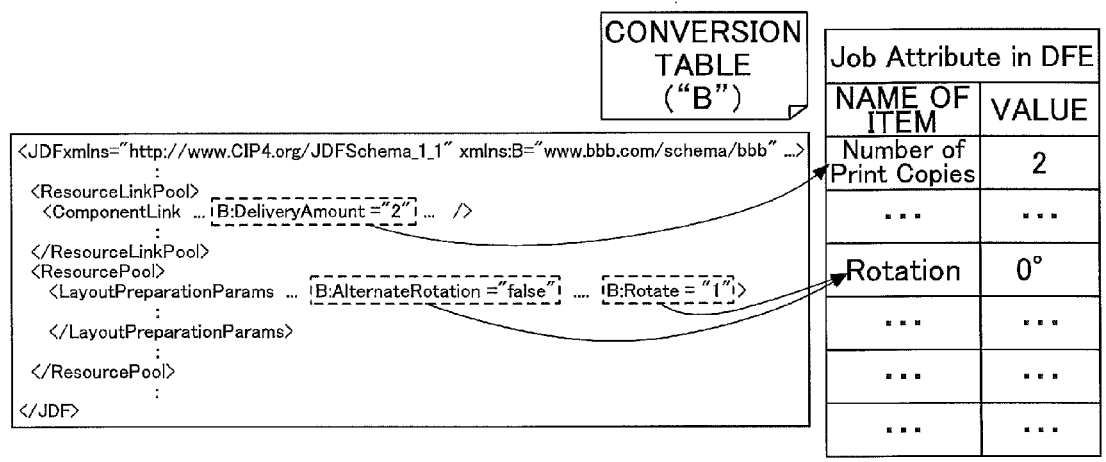
FIG. 9C is another illustration diagram illustrating creation of a "Job Attribute in DFE"

In the following, creation of the "Job Attribute in DFE" will be described with reference to FIGS. 8A, 8B and 8C, and FIGS. 9A, 9B and 9C. FIGS. 8A, 8B, and 8C are illustration diagrams illustrating an example of a conversion table. FIGS. 9A, 9B and 9C are illustration diagrams for illustrating creation of the "Job Attribute in DFE". The JDF analyzing unit 56 converts the JDF, using the conversion table 66 corresponding to the manufacturer of the application 12 having created the JDF, into the "Job Attribute in DFE".

In a case where the manufacturer of the application 12 having created the JDF cannot be determined, JDF is converted, by using every conversion table 66, into the "Job Attribute in DFE". In this case, the "Job Attribute in DFE" for every RIP engine 59 is created.

FIG. 8A is an illustration diagram illustrating an example of a conversion table of "C". In the conversion table 66 of "C", a value of an attribute named "Amount" corresponds to a value of an item named "Number of Print Copies" while a value of an attribute named "Rotate" corresponds to a value of an item named "Rotation".

As shown in FIGS. 9A, 9B and 9C, the JDF is converted in a manner where the values of the attributes are used as the values of items in the "Job Attribute in DFE" with reference to the conversion table for correlating the attributes of the tags in the JDF with the items in "Job Attribute in DFE".

The JDF analyzing unit 56 includes not only the conversion table 66 of "C" but also the conversion table 66 of "A" and the conversion table 66 of "B". FIG. 8B is an illustration diagram illustrating an example of a conversion table 66 of "A". FIG. 8C is an illustration diagram illustrating an example of a conversion table 66 of "B". As described above, the JDF analyzing unit 56 detects a description indicating the extended tags in the JDF to determine the manufacturer of the application 12, thereby selecting the conversion table corresponding to the manufacturer.

The JDFs of "A" and "B" can be also converted similarly. In the conversion table 66 of "A", a value of an attribute named "A:Amount" corresponds to a value of an item named "Number of Print Copies" while a value of an attribute named "A:Rotate" corresponds to a value of an item named "Rotation". In the conversion table 66 of "B", a value of an attribute named "B:DeliveryAmount" corresponds to a value of an item named "Number of Print Copies" while a value of an attribute named "Rotate" corresponds to a value of an item named "Rotation". Additionally, in the conversion table 66 of "B", operation of rotation is valid only in a case where a value of an attribute named "B:AlternateRotation" is "False". Therefore, when determined as the JDF of "A" or JDF of "B" by the JDF analyzing unit 56, the "Job Attribute in DFE" can be created similarly to the case of the JDF of "C".

Additionally, when the JDF analyzing unit 56 determines that a format related to aggregation printing imposition in the printing job is described by an application 12 of a manufacturer other than own manufacture (manufacturer "C"), the JDF analyzing unit 56 sets the "Sheet Mode" at an item named "RIP Control MODE" in the "Job Attribute in DFE". When the application 12 is own (of "C") application, or a format related to aggregation printing imposition in the printing job is described in the same manner as described by the own application 12, the "Page Mode" is set at the item named "RIP Control MODE". Therefore, the RIP controlling unit 58 can control the RIP commands to output to the RIP engines 59, with reference to the "RIP Control MODE".

FIG. 10 is an illustration diagram illustrating an example of a "Job Attribute in DFE".

The "Job Attribute in DFE" is broadly divided into "Job Information", which is related to execution of the job; "Edit Information", which is related to the raster data; and "Finishing Information", which is related to finishing processes.

The "Job Information" includes an item of "Number of Print Copies" for indicating the number of print copies.

The "Edit Information" includes an item of "Direction Information" for indicating print direction.

An item of "Print Side Information" in the "Edit Information" indicates print side of the sheet.

An item of "Rotation" in the "Edit Information" indicates a rotation angle of a page.

An item of "Expansion/Reduction" in the "Edit Information" indicates expansion/reduction and rates thereof.

An item of "Position of Image: Offset" in the "Edit Information" indicates an offset of the image.

An item of "Position of Image: Position Adjusting Information" in the "Edit Information" indicates position adjusting of the image.

An item of "Layout Information: Custom•Imposition" in the "Edit Information" indicates custom imposition.

An item of "Layout Information: number of pages" in the "Edit Information" indicates the number of the pages in one sheet.

An item of "Layout Information: Imposition Information" in the "Edit Information" indicates information related to imposition.

An item of "Layout Information: Page Oder Information" in the "Edit Information" indicates Order in which the pages are printed.

An item of "Layout Information: Creep position Adjustment" in the "Edit Information" indicates information related to creep position adjustment.

An item of "Margin Information" in the "Edit Information" indicates information related to margin such as fitting box, or gutter.

An item of "Crop•Mark Information: Center•Crop•Mark Information" in the "Edit Information" indicates information related to center•crop•mark.

An item of "Crop•Mark Information: Corner•Crop•Mark Information" in the "Edit Information" indicates information related to corner•crop•mark.

An item of "Collate Information" in the "Finishing Information" indicates whether a document is printed page basis or document basis in a case where a plurality of copies of the document are printed.

An item of "Staple/Bind Information" in the "Finishing Information" indicates information related to staple/bind.

An item of "Punch Information" in the "Finishing Information" indicates information related to punching.

An item of "Folding Information" in the "Finishing Information" indicates information related to folding.

An item of "Trim Information" in the "Finishing Information" indicates information related to trim.

An item of "Output Tray Information" in the "Finishing Information" indicates information related to an output tray.

An item of "Input Tray Information" in the "Finishing Information" indicates information related to an input tray.

An item of "Cover•Sheet Information" in the "Finishing Information" indicates information related to a cover•sheet.

Also, as described in FIG. 10, "RIP Control Mode" is set in the "Job Attribute in DFE".

The "Page Mode" or the "Sheet Mode" is set in the "RIP Control Mode". Additionally, in the dummy JDF, the "Page Mode" is set in the "RIP Control Mode".

[RIP Parameter List]

FIG. 11 is an illustration diagram illustrating an example of the "RIP Parameter List".

"Input/Output Data Type Information" indicates types of input data and output data (input data and output data indicates not only the PDL but also text files or JPEG image data).

"Input/Output Data Read/Write position designation Information" indicates method for designating the offset of input data and output data (read position/write position). For example, "from designated position", "from current position", "from tail end", etc., are indicated.

"Input/Output Data Read/Write position Information" indicates current processing position of input data and output data.

"Input/Output Data Read/Write Execution Mode Information" indicates modes of execution. For example, "READ", "WRITE", "READ_WRITE", etc., are indicated.

"Measurement Unit Information (Dimension)" indicates measurement units used in the "RIP Parameter List". For example, "mm", "inch", "pel", "point", etc., are indicated.

"Input/Output Data Compression Method Information" indicates methods for compressing input data and output data. For example, "UNCOMPRESSED", "PACKBITS", etc., are indicated.

"RIP Control Mode" indicates control modes of the aggregation printing imposition. For example, "Page Mode" or "Sheet Mode" is indicated.

"Input/Output Image Information Part" includes "Information Related to Output Image", "Information Related to Input Image", and "Information Related to Operation of Image".

"Image Format•Type" indicates types of format of the output images. For example, "Raster", etc., are indicated.

"Image Format•Dimension" indicates dimensions of the output image format.

"Image Format•Resolution" indicates resolution of the output image format.

"Position of Image" indicates position of the output image.

"Color Separation Information" indicates color separation (color decomposition). For example, "k", "cymk", "separation", etc., are indicated.

"Color Plane•Fit•Policy Information" indicates methods for operating color planes.

"Plane Shift Information" indicates amount of shift of the color plane.

"Number of Bits in Image Format" indicates number of bits in the output image format.

"Image Direction Information" indicates directions of the page of the output image.

"Image Formation Position Information" indicates position information of the crop•area.

"Image Formation Size Information" indicates size information of the crop•area.

"Image Formation Method Information" indicates policy of clip.

"Color ICC Information" indicates information related to color ICC profiles.

"Font Replacement Information" indicates information related to font replacement.

"Image Formation Basic Point Information" indicates basic points of the image formation. For example, "Center", "Top Right", etc., are indicated.

"Flat K Black Information" indicates information related to flat K black".

"Rendering Information" indicates information related to the rendering (rasterize).

"Image Format•Type" indicates types of format of the input image. For example, "Raster", etc., are indicated.

"Image Format•Dimension" indicates dimensions of the input image format.

"Image Format•Resolution" indicates resolution of the input image format.

"Position of Image" indicates positions of the input image.

"Input Data" indicates the input data.

"Page Range Information" indicates page numbers.

"Color ICC Information" indicates information related to color ICC profiles.

"Scaling•Offset Information" indicates offsets of expansion/reduction algorithm. For example, "Horizontal Offset", "Vertical Offset", etc., are indicated.

"Object•Area Information" indicates the width and the height of the object area.

"Halftone Information" indicates offsets of the halftone. For example, "Horizontal Offset", "Vertical Offset", etc., are indicated.

"Scaling•Algorithm Information" indicates methods of scaling.

"Information Related to PDL" Includes "Data Area", "Size Information", and "Data Arrangement Method".

The "Data Area" indicates information of the area storing the PDL. Font information, information of number of the pages, etc., are included in the PDL stored in the area.

The "Size Information" indicates the size of the PDL.

"Data Arrangement Method" indicates arrangement method of data. For example, "Little Endian", "Big Endian", etc., are indicated.

[Example Setting Screens of UI Controlling Unit]

In the following, examples of setting screens respectively displayed by the "A" UI controlling unit 62a, and the "B" UI controlling unit 62b will be described. A setting screen of the "A" UI controlling unit 62a is displayed so that the attributes and the values thereof described in the JDF by the application 12 of "A" are displayed in a manner requested by the application 12 of "A", and the values of the attributes, which can be handled to perform rendering by the RIP engine 59 of "A", are settable.

Figures 12A, 12B:
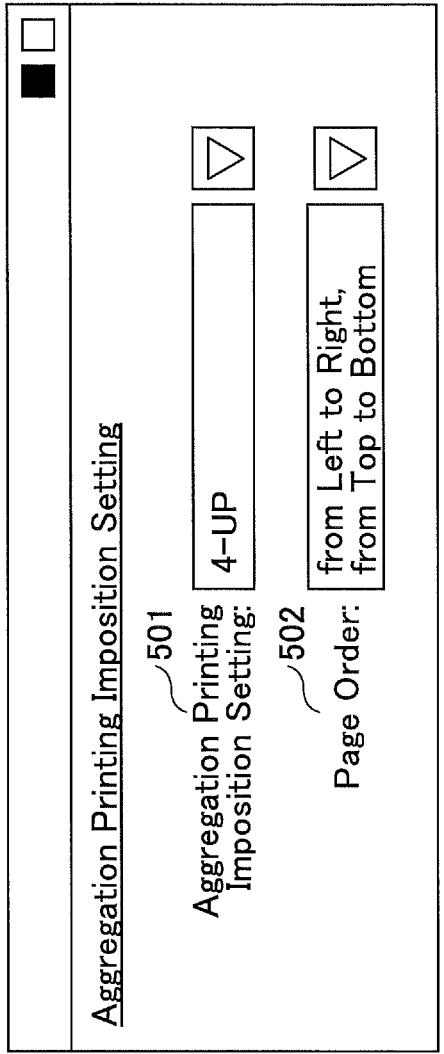
FIG. 12A is a drawing showing an example of a setting screen of the "A" UI controlling unit.
FIG. 12B is an illustration diagram illustrating an example of the JDF.

FIG. 12A is a drawing showing an example of a setting screen of the "A" UI controlling unit 62a displayed on the display 330. FIG. 12B is an illustration diagram illustrating an example of the JDF created by the application 12 of "A". In FIG. 12B, "A:NumberUp" in a tag "LayoutPreparationParams" indicates that the JDF is for extended setting options of "A" for aggregation printing imposition. Also, the value of the attribute "2 2" indicates that the aggregation printing imposition is set as 4-up.

The "A" UI controlling unit 62a determines that the value of the attribute "2 2" means the "4-up", based on the determination result that the JDF is for the RIP engine 59 of "A". Then, the "A" UI controlling unit 62a displays the "4-up" as a setting value of a setting item "aggregation printing imposition setting" 501, where the RIP engine 59 of "A" supports the "4-up".

Thus, as shown in FIG. 12A, the "4-up" is displayed as the setting value of the setting item "Aggregation Printing Imposition Setting" 501. The "A" UI controlling unit 62a accepts not only the "4-up" but also "1-up", "2-up", "9-up", and "16-up", as the setting options settable as the setting value of the "Aggregation Printing Imposition Setting" in the aggregation printing imposition by the RIP engine 59 of "A". Therefore, these setting options are prepared to be displayed, and the value of the attribute "1 1" is converted into and displayed as the "1-up", the value of the attribute "1 2" is converted into and displayed as the "2-up", the value of the attribute "3 3" is converted into and displayed as the "9-up", and the value of the attribute "4 4" is converted into and displayed as the "16-up". These are displayed as being selectable.

Also, when the setting value is changed into "1-up", "2-up", "9-up", or "16-up", the value of the attribute is changed respectively into "1 1", "1 2", "3 3", or "4 4", thereby updating the JDF.

Further, the "A" UI controlling unit 62a displays "from Left to Right, from Top to Bottom", "from Left to Right, from Bottom to Top", "from Right to Left, from Top to Bottom", "from Right to Left, from Bottom to Top", "from Top to Bottom, from Left to Right", "from Top to Bottom, from Right to Left", "from Bottom to Top, from Left to Right", and "from Bottom to Top, from Right to Left"; as the setting options settable as the setting value of the a setting item "Page Order" 502. These setting options are prepared to be displayed with the setting screen, and the "A" UI controlling unit 62a accepts changes required by the user.

Figures 13A, 13B:
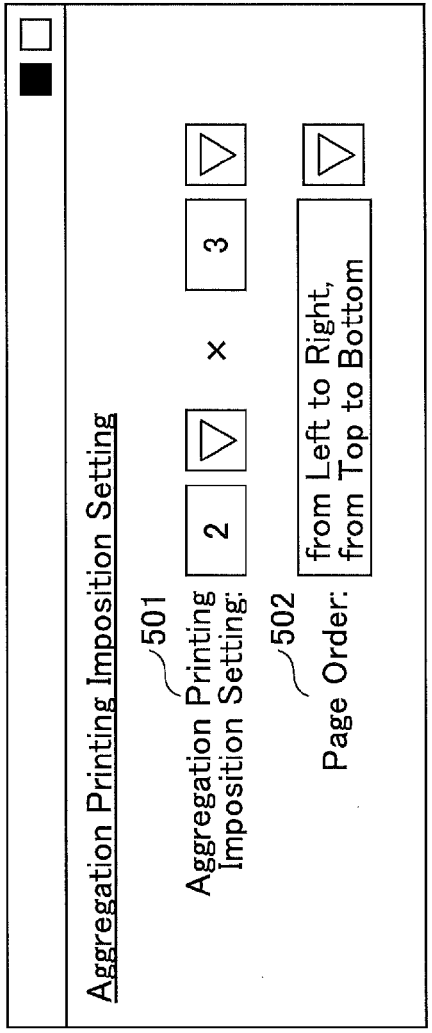
FIG. 13A is a drawing showing an example of a setting screen of the "B" UI controlling unit.
FIG. 13B is an illustration diagram illustrating an example of the JDF.

FIG. 13A is a drawing showing an example of a setting screen of the "B" UI controlling unit. FIG. 13B is an illustration diagram illustrating an example of the JDF created by the application 12 of "B". In FIG. 13B, "B:NumberUp" in a tag "LayoutPreparationParams" indicates that the JDF is for extended setting options of "B" for aggregation printing imposition. Also, the value of the attribute "2 3" indicates that the aggregation printing imposition is set as "2×3".

The "B" UI controlling unit 62b determines that the value of the attribute "2 3" means the "2×3", based on the determination result that the JDF is for the RIP engine 59 of "B". Then, the "B" UI controlling unit 62b displays the "2" and the "3" as setting values of a setting item "Aggregation Printing Imposition Setting" 501, where the RIP engine 59 of "B" supports the "2×3".

Thus, as shown in FIG. 13A, the "2" and the "3" are displayed as the setting value of the setting item "Aggregation Printing Imposition Setting" 501. The "B" UI controlling unit 62b accepts "M (=1 to 5)" and "N (=1 to 5) (combination of M×N, where M may be any one of 1 to 5 and N may be any one of 1 to 5), as the setting options of combinations of longitudinal and lateral settable as the setting values of the "Aggregation Printing Imposition Setting" in the aggregation printing imposition by the RIP engine 59 of "B". Therefore, these setting options are prepared to be displayed, and the value of the attribute "M N" is converted into and displayed as the "M" in the left side of the "Aggregation Printing Imposition Setting" 501 (number of pages aggregated in longitudinal direction) and the "N" in the right side of "Aggregation Printing Imposition Setting" 501 (number of pages aggregated in lateral direction). Also, when the "M" or "N" of the "Aggregation Printing Imposition Setting" 501 is changed, the corresponding value of the attribute is also changed, thereby updating the JDF.

Further, the "B" UI controlling unit 62b displays "from Left to Right, from Top to Bottom", "from Right to Left, from Top to Bottom", "from Right to Left, from Bottom to Top", "from Top to Bottom, from Left to Right", and "from Top to Bottom, from Right to Left"; as the setting options settable as the setting value of the a setting item "Page Order" 502. These setting options are prepared to be displayed with the setting screen, in the "B" UI controlling unit 62b.

Therefore, the "A" UI controlling unit 62a can appropriately display the JDF created by the application 12 of "A" (display the attributes and the values thereof described by the application 12 in the JDF, in a manner required by the application 12), while the "B" UI controlling unit 62b can appropriately display the JDF created by the application 12 of "B". Further, since the user can set the values of the attributes only within the range of the values of the attributes which can be handled by the respective RIP engines 59, the values of the attributes can be changed only within the range of the values of the attributes which can be handled to perform rendering of the printing job by the RIP engine 59 of "A" or the RIP engine 59 of "B".

Additionally, although a description of the case of the "C" UI controlling unit 62c is omitted, the "C" UI controlling unit 62c can be similarly operated to appropriately display the JDF created by the application 12 of "C", and the values of the attributes can be changed only within the range of the values of the attributes which can be handled to perform rendering of the printing job by the RIP engine 59 of "C".

[When JDF Analyzing Unit Cannot Determine RIP Engine]

The DFE 32, including the RIP engines 59 of "A", "B", and "C", may receive a printing job created by an application 12 of "D". In this case, the JDF analyzing unit 56, receiving the JDF from the UI controlling unit 54, cannot determine for which RIP engine 59 the JDF has been created (determines as unknown). In such case, the parameter error determining unit 65 creates the parameter error information and outputs it to the UI control unit 54.

FIG. 14 is a drawing showing an example of the JDF created by the application 12 of "D". The JDF analyzing unit 56 determines that the RIP engine 59 is unknown in a case where the extended description ("A:", "B:", or "C:") of the respective manufacturers cannot be detected. The JDF analyzing unit 56 may determine that the RIP engine 59 is unknown in a case where the extended description ("D:") of an non-supported RIP engine (a manufacturer of an non-supported application 12) 59 is detected.

"D:NumberUp="1 3"" indicates the JDF is for setting options of aggregation printing imposition of "1×3".

"D:CustomCellOrder="1 3 2"" indicates that page 1 to 3 are printed in order of "1, 2, 3", in the aggregation printing imposition being set the "1×3". Additionally, Cell means respective parts in the sheet corresponding to the respective aggregated pages.

"D:FoldCatalog="F6-2"" indicates that the sheet is folded in three (from left side, projected fold the recessed fold) in the finishing process.

The parameter error determining unit 65 determine the values of the attribute not supported by the RIP engine 59 of "A", the RIP engine 59 of "B", and the RIP engine 59 of "C", in every attribute. The attributes not supported by the respective RIP engines are omitted. In such case, the user's desired finished appearance is unlikely to be obtained.

NumberUp

The RIP engine 59 of "A" accepts the setting options of aggregation printing imposition as 1-up, 2-up, 3-up, 4-up, 9-up, or 16-up.

The RIP engine 59 of "B" accepts the setting options of aggregation printing imposition within the range from "1×1" to "5×5" where the longitudinal and the lateral are separately selected.

The setting option of aggregation printing imposition in the JDF of "D" is described as "D:NumberUp="1 3"". Therefore, the parameter error determining unit 65 determines that the RIP engine 59 of "A" does not support the attribute described in the received printing job (of "D"), in setting aggregation printing imposition. Meanwhile, the parameter error determining unit 65 determines that the RIP engine 59 of "B" and the RIP engine 59 of "C" respectively support the attribute described in the received printing job (of "D").

Additionally, in a case where such as "D:NumberUp="2 2"" is described instead of the "D:NumberUp="1 3"", the RIP engine 59 of "A" is also determined to support the attribute described in the received printing job (of "D"), since the value of the attribute is now convertible into N-up.

CustomCellOrder

The RIP engine 59 of "A" supports "from Left to Right, from Top to Bottom", "from Left to Right, from Bottom to Top", "from Right to Left, from Top to Bottom", "from Right to Left, from Bottom to Top", "from Top to Bottom, from Left to Right", "from Top to Bottom, from Right to Left", "from Bottom to Top, from Left to Right", and "from Bottom to Top, from Right to Left".

The RIP engine 59 of "B" supports "from Left to Right" and "from Right to Left".

The RIP engine 59 of "C" supports order of "1, 2, 3", "3, 2, 1", "1, 3, 2", "3, 1, 2", "2, 1, 3", and "2, 3, 1" in the aggregation printing imposition being set the "1×3"

The setting option of page order in the JDF of "D" is described as "D:CustomCellOrder="1 3 2"". Therefore, the parameter error determining unit 65 determines that the RIP engine 59 of "A" does not support the attribute described in the received printing job (of "D"), in setting page order. The RIP engine 59 of "B" is determined not to support either.

The RIP engine 59 of "C" is determined to support.

FoldCatalog

This attribute is converted into the finishing information in the "Job Attribute in DFE".

The finishing information indicates information related to the function of the printer 31. Therefore, the finishing information does not need to be supported by the RIP engines and does not affect the raster data. Therefore, the determination of the RIP engine is not performed.

The parameter error determining unit 65 detects such attributes that are determined to be omitted in each of the RIP engines 59, thereby outputting them to the UI control unit 54. In the example of FIG. 14, the parameter error information as follows is output.

The RIP engine 59 of "A" . . . N-up imposition (aggregation printing imposition), Page Order (Cell Order)

The RIP engine 59 of "B" . . . Page Order (Cell Order)

The RIP engine 59 of "C" . . . None

[Page Image for Preview Screen]

The DFE 32 includes a function for displaying a preview screen on the display 330 before printing the raster data. In the present embodiment, when the JDF analyzing unit 56 determines that the RIP engine for the received printing job is unknown, the raster data virtually printed through the respective RIP engines 59 (created by the respective RIP engines 59) is displayed on the preview screen. Additionally, the first (1) page is shown as "A", the second (2) page is shown as "B", and the third (3) page is shown as "C".

Figure 15A:
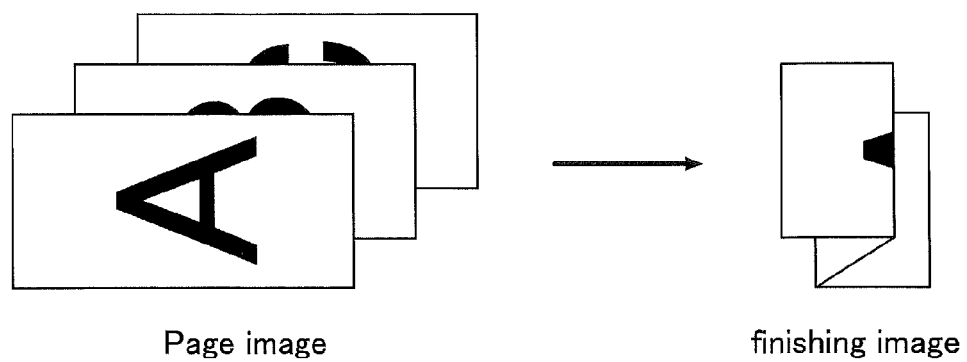
FIG. 15A is a drawing showing an example of a page image and a finishing image of the raster data.
Figure 15B:
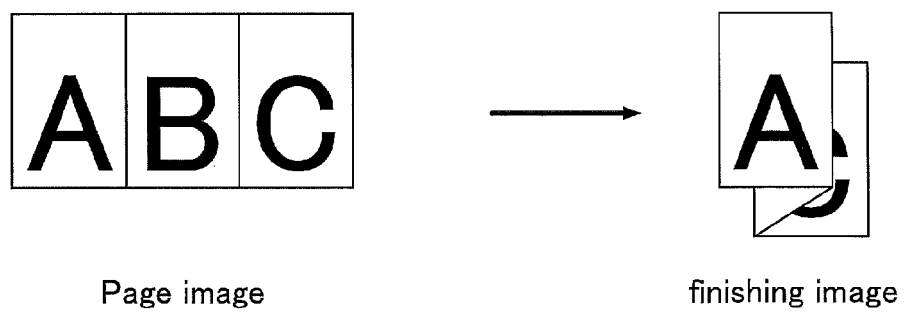
FIG. 15B is a drawing showing another example of a page image and a finishing image of the raster data.
Figure 15C:
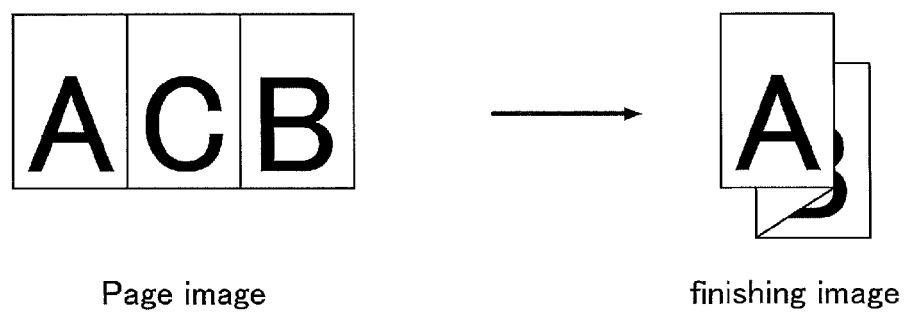
FIG. 15C is a drawing showing another example of a page image and a finishing image of the raster data.

FIG. 15A is a drawing showing an example of a page image and a finishing image of the raster data created by the RIP engine 59 of "A". FIG. 15B is a drawing showing an example of a page image and a finishing image of the raster data created by the RIP engine 59 of "B". FIG. 15C is a drawing showing an example of a page image and a finishing image of the raster data created by the RIP engine 59 of "C". The finishing images are examples of images on which the finishing processes have been performed.

The RIP engine 59 of "A" does not support the aggregation printing imposition setting "1×3". Therefore, for example, "1" in the "1×3" is extracted when converting into the "Job Attribute in DFE" based on the conversion table of "A", then the setting option of aggregation printing imposition is converted into the value of the attribute "1-up". Thus, as shown in FIG. 15A, respective pages of 1 to 3 are rendered page by page, in the page image.

The RIP engine 59 of "B" supports the aggregation printing imposition setting "1×3", however does not support the page order setting. Therefore, while the aggregation printing imposition setting "1×3" is appropriately converted when converting into the "Job Attribute in DFE" based on the conversion table of "B", the page order (1 3 2) is converted, for example, into "from Left to Right". Thus, as shown in FIG. 15B, respective pages of 1 to 3 are rendered in a sheet in order of 1, 2, 3, in the page image.

The RIP engine 59 of "C" supports the aggregation printing imposition setting "1×3", and supports the page order setting. Therefore, the aggregation printing imposition setting "1×3" is appropriately converted when converting into the "Job Attribute in DFE" based on the conversion table of "C", and also, the page order (1 3 2) is appropriately converted. Thus, as shown in FIG. 15C, respective pages of 1 to 3 are rendered in a sheet in order of 1, 3, 2, in the page image. The page image shown in FIG. 15C has a finished appearance desired by the user who creates the printing job with the application 12 of "D" (or a close finished appearance to this).

Further, the individual UI controlling unit 63 creates the finishing images corresponding to the page images created by the RIP engines 59. When there is an attribute which is converted into the finishing information in the "Job Attribute in DFE", such as "FoldCatalog", the parameter error determining unit 65 outputs it to the UI controlling unit 54. Thus, the individual UI controlling unit 63 can create the finishing images of the respective RIP engines 59.

The individual UI controlling unit 63 determines, based on the "FoldCatalog="F6-2"", that the finishing process is folding in three (from left side, projected fold and the recessed fold), then combining the page image of page 1 to 3 with the icon which has been prepared for showing the preview screen of finished appearance being folded in three. Thus, finishing images, shown in FIGS. 15A to 15C, are displayed.

[Examples of Screens Displayed by Individual UI Controlling Unit]

Figure 16A:
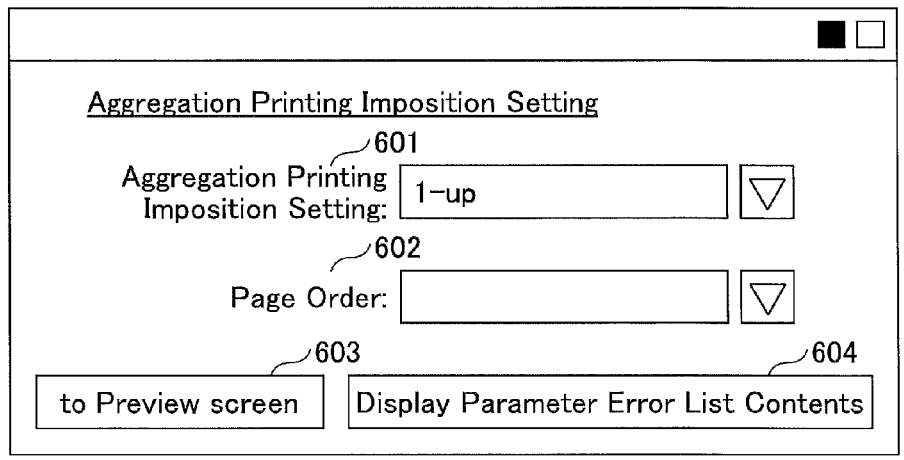
FIG. 16A is a drawing showing an example setting screen of "A"
Figure 16B:
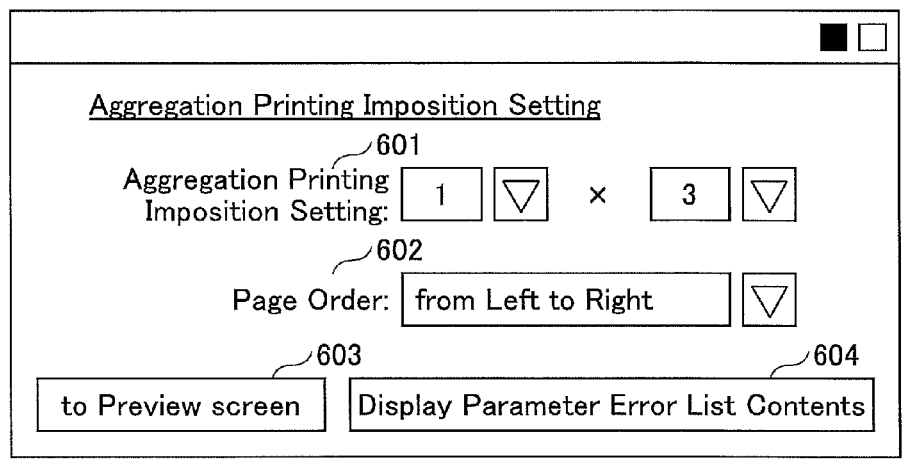
FIG. 16B is a drawing showing an example setting screen of "B"
Figure 16C:
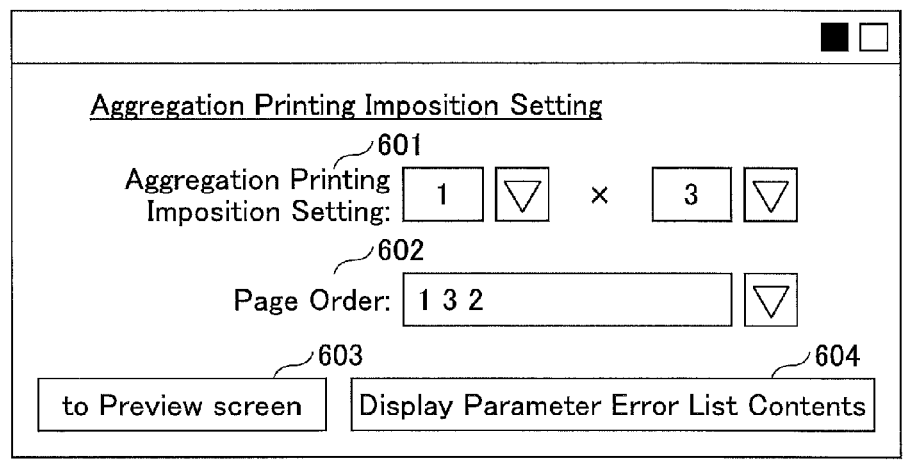
FIG. 16C is a drawing showing an example setting screen of "C"

FIGS. 16A to 16C are drawings for showing examples of individual setting screens displayed on the display 330, when the JDF analyzing unit determines that the RIP engine 59 is unknown. Additionally, before displaying the individual setting screens, the user has operated the DFE 32 so as to display a setting screen for a printing job created by "D". FIGS. 16A to 16C shows an example of a plurality of display screens.

Figure 17A:
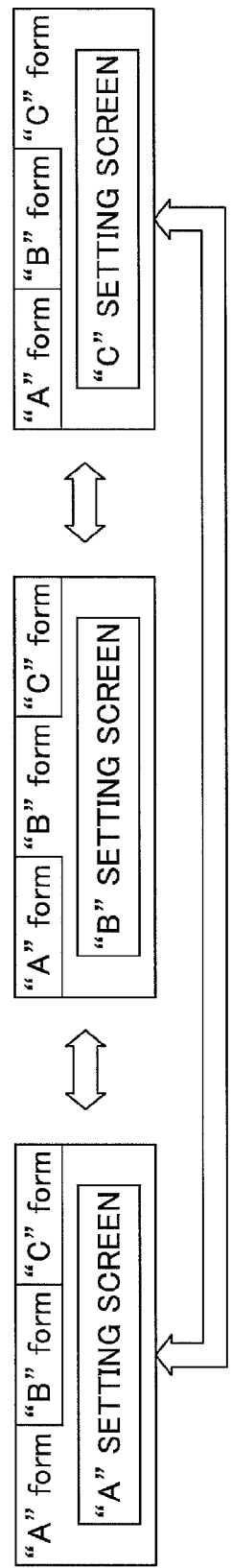
FIG. 17A is an example illustration diagram for illustrating switching the displayed setting screens.
Figure 17B:
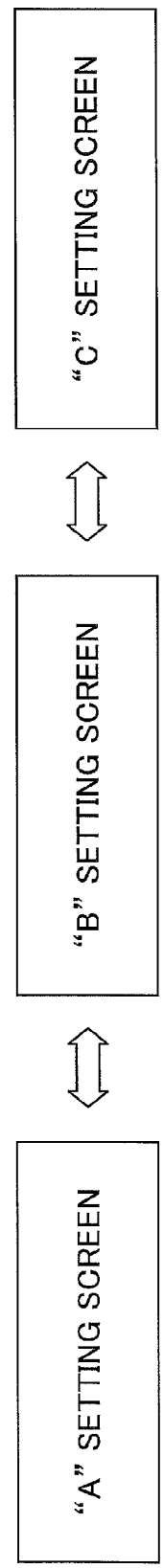
FIG. 17B is another example illustration diagram for illustrating switching the displayed setting screens.

The setting screens shown in FIGS. 16A to 16C are displayed by being switched by the user operation, as shown in FIGS. 17A and 17B. The user knows that the RIP engines 59 of the DFE 32 do not support the printing job created by the application 12 of "D" through the screen configuration such as shown in FIGS. 17A and 17B, or through an explicit massage.

The individual UI controlling unit 63 displays the printing job of "D" with setting screens of "A", "B", and "C". That is, the individual UI controlling unit 63 includes the respective functions of the "A" UI controlling unit 62a, the "B" UI controlling unit 62b, and the "C" UI controlling unit 62c.

FIG. 16A is a drawing showing the setting screen of "A" for the aggregation printing imposition setting and the page order setting. FIG. 16B is a drawing showing the setting screen of "B" for the aggregation printing imposition setting and the page order setting. FIG. 16C is a drawing showing the setting screen of "C" for the aggregation printing imposition setting and the page order setting. Additionally, the JDF of "D" is shown in FIG. 14.

The RIP engine 59 of "A" does not support the aggregation printing imposition setting "1×3". Therefore, "1" in the "1×3" is extracted and determined as the aggregation printing imposition setting "1-up". Thus, the "1-up" is shown in "Aggregation Printing Imposition Setting" 601. Also, the individual UI controlling unit 63 displays, as selectable options, the setting options for aggregation printing imposition of "2-up, 3-up, 4-up 9-up and 16-up" which are supported by the RIP engine 59 of "A".

Further, when setting "1-up", the page order setting is not required since only one page is printed in one sheet. In this case, no setting options are shown in "Page Order" 602, and user cannot operate to set any value in the "Page Order" 602.

The RIP engine 59 of "B" supports the aggregation printing imposition setting "1×3". Therefore, "1" and "3" in the "1×3" are extracted. Thus, in "Aggregation Printing Imposition Setting" 601, the "1" is shown as a longitudinal aggregation number, and the "3" is shown as a lateral aggregation number. Further, the individual UI controlling unit 63 displays, as selectable options, the longitudinal aggregation number of "1" to "5" and the lateral aggregation number of "1" to "5", which are supported by the RIP engine 59 of "B", in "Aggregation Printing Imposition Setting" 601.

The RIP engine 59 of "B" does not support "1 3 2" in the JDF since the RIP engine 59 of "B" supports only "from Left to Right" and "from Right to Left". Therefore, the individual UI controlling unit 63 displays, for example, the "from Left to Right" in "Page Order" 602. Further, the individual UI controlling unit 63 displays, as selectable options, the "from Left to Right", and the "from Right to Left", which are supported by the RIP engine 59 of "B", in "Page Order" 602.

The aggregation printing imposition setting in the RIP engine 59 of "C" is the same as that of the RIP engine 59 of "B". Further, The RIP engine 59 of "C" supports the page order setting "1 3 2" in the JDF. Therefore, the individual UI controlling unit 63 displays, for example, "1 3 2" in "Page Order" 602. Further, the individual UI controlling unit 63 displays, as selectable options, "1 2 3", "3 2 1", "1 3 2", "3 1 2", "2 1 3", and "2 3 1", which are supported by the RIP engine 59 of "C", in "Page Order" 602.

The individual setting screen includes a "to Preview screen" button 603, and a "Display Parameter Error List Contents" button 604. When pressing the button 603, the preview screen for previewing rendering images of the printing job of "D" by the respective RIP engines 59. When pressing the button 604, the parameter error information is displayed.

As shown in FIG. 17A, the user may switch the displayed setting screens by using tabs, or as shown in FIG. 17B, the user may switch the displayed setting screen by the user operation.

FIGS. 17A and 17B are examples for illustrating switching the displayed setting screens. In FIG. 17A, since area of the display 330 is limited, in FIG. 17A, the setting screen of "A", the setting screen of "B", and the setting screen of "C" can be switched to be displayed according to the selected tab. The user selects the tabs of "A form", "B form", or "C form". The individual UI controlling unit 63 switches the displayed setting screens, recognizing the tab selected by the user.

In FIG. 17B, only one setting screen is displayed on the display 330. In this case, the respective setting screens are switched to be displayed when the user operates by tracing the display right and left (for example, swipe operation).

Figure 18:
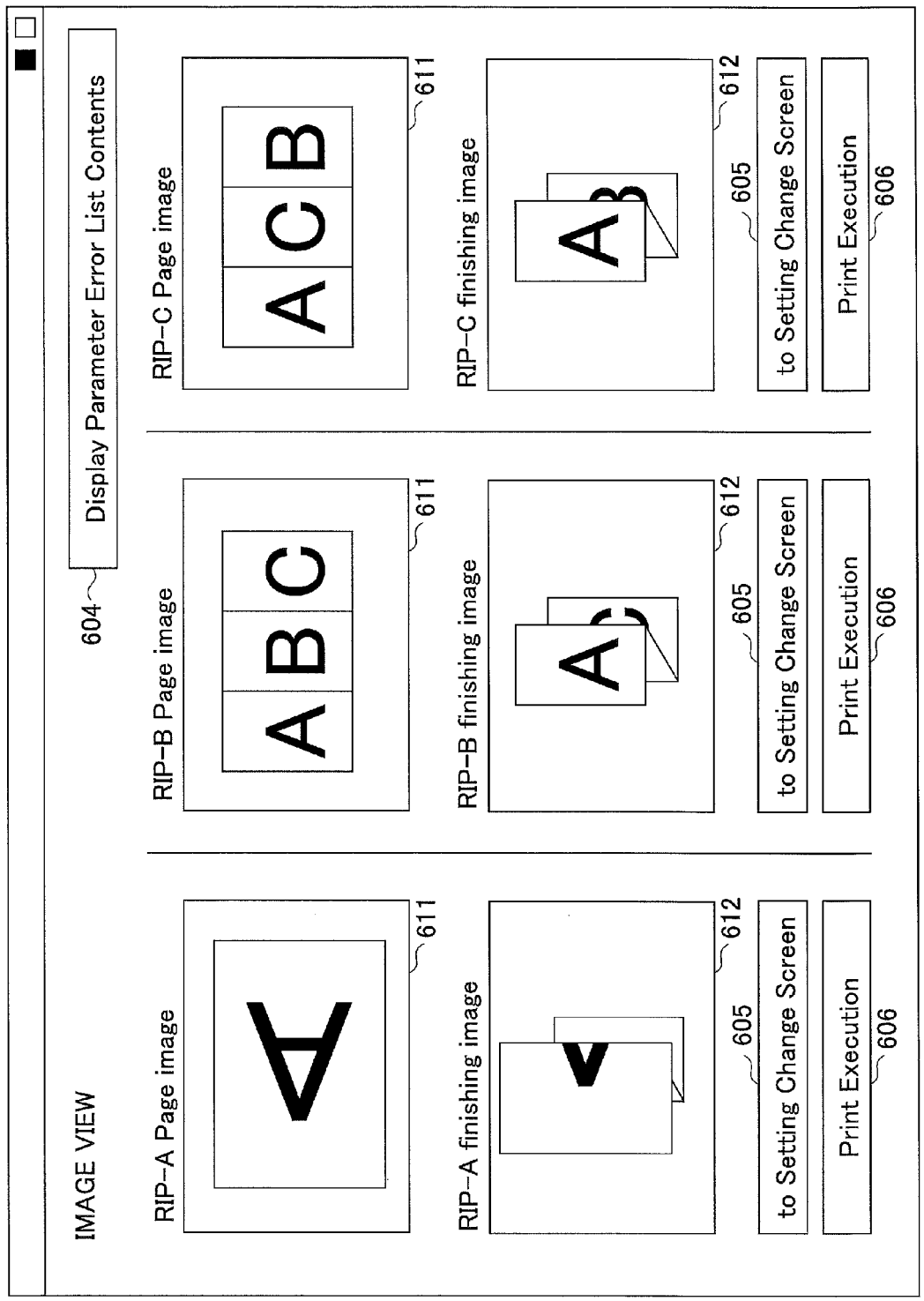
FIG. 18 is a drawing showing an example of the displayed setting screen.

In the following the preview screen will be described with reference or FIG. 18. FIG. 18 is a drawing showing an example of the displayed setting screen. When the user presses the button 603, the individual UI controlling unit 63 displays a preview screen shown in FIG. 18. The preview screen is divided into three display zones for the respective RIP engines 59.

The respective display zones include a page image area 611, a finishing image area 612, "to Setting Change Screen" button 605, and "Print Execution" button 606. Further, the preview screen also includes the "Display Parameter Error List Contents" button 604.

The respective page images are displayed in the respective page image areas 611, and the respective finishing image are displayed in the respective finishing image areas 612. The page image is created by the RIP engine 59 to be stored in the image storage unit 60, then retrieved by the job controlling unit 55 to be output to the UI controlling unit 54. The individual controlling unit 63 creates the finishing image based on the page image.

The button 606 is pressed to let the DFE 32 print the page image currently displayed in the preview screen.

Also, when the user presses the button 605, the individual setting screens shown in FIGS. 16A-16C are displayed on the display 330.

Further, when the user presses the button 604 in the screens shown in FIGS. 16A-16C, or FIG. 18, a parameter error information screen is displayed.

Figure 19:
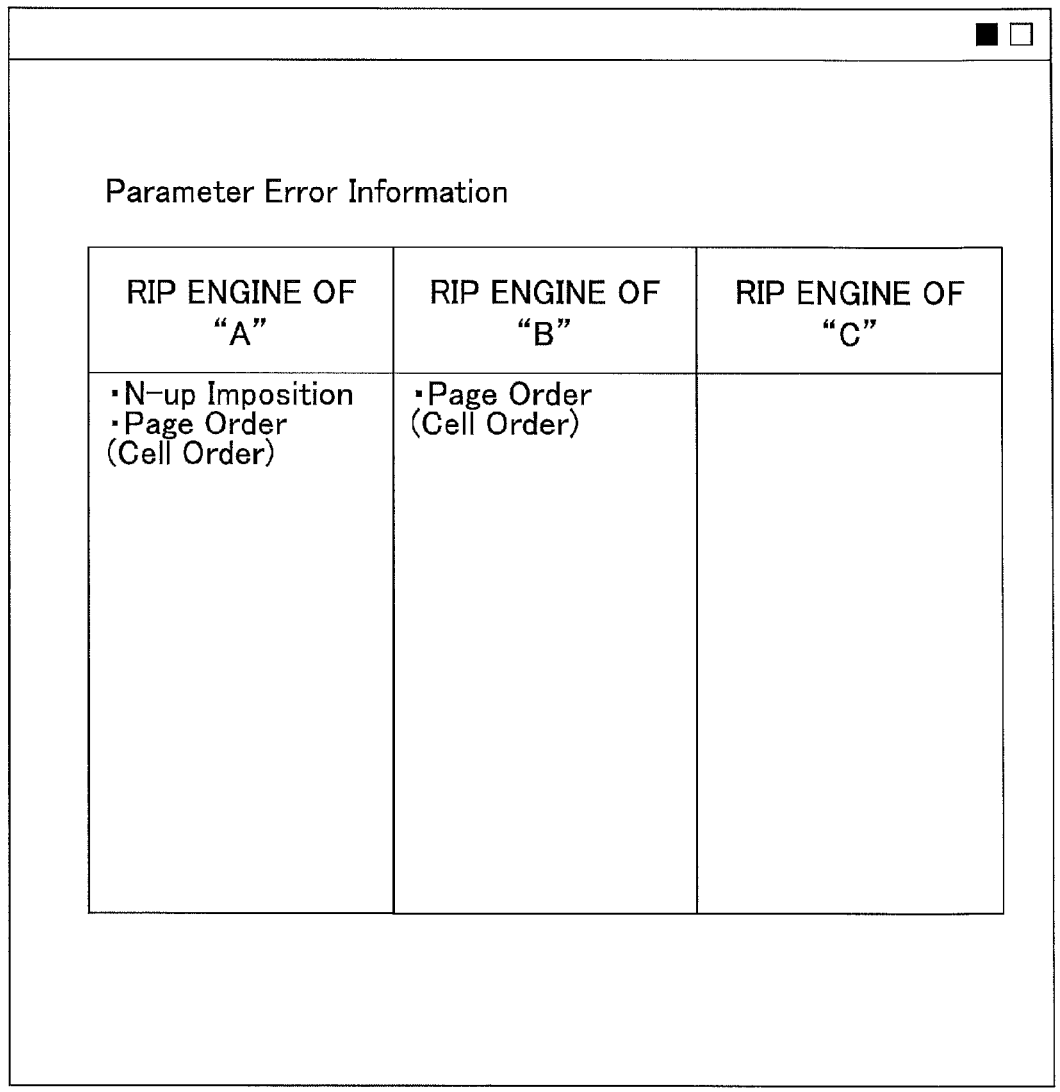
FIG. 19 is a drawing showing an example of the parameter error information screen.

FIG. 19 is a drawing showing an example of the parameter error information screen displayed on the display 330. When receiving the parameter error information from the parameter error determining unit 65, the parameter error list creating unit 64 in the UI controlling unit 54 displays the parameter error information associated with the respective RIP engines 59. As described above, the RIP engine 59 of "A" does not accept the aggregation printing imposition setting and the page order (cell order) setting of "D" to create the raster data, therefore "N-up imposition, Page Order (Cell Order)" is displayed as the parameter error information.

The RIP engine 59 of "B" does not accept the page order (cell order) setting of "D" to create the raster data, therefore "N-up imposition" is displayed as the parameter error information. The RIP engine 59 of "C" can appropriately create the raster data analyzing the JDF of "D", therefore nothing is displayed as the parameter error information.

Thus, the user can surely recognize which attributes are omitted by the respective selected RIP engines 59.

[Operation Flow]

Figure 20:
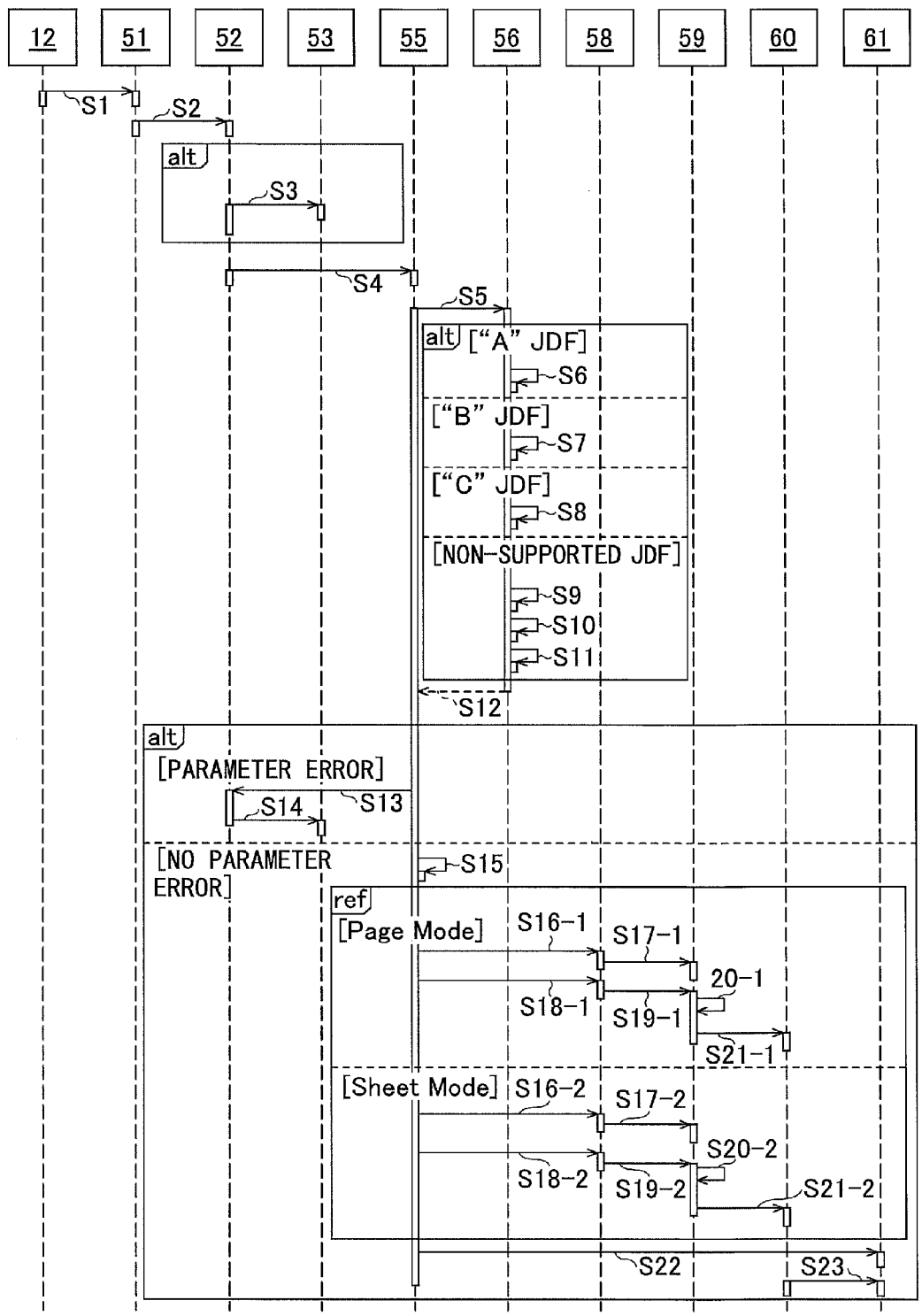
FIG. 20 is a sequence diagram illustrating the operation flow of the DFE to process the printing job.

In the following, an operation flow of the DFE 32 will be described with reference to FIGS. 20 and 21. FIG. 20 is a sequence diagram illustrating the operation flow of the DFE 32 to process the printing job.

In step S1, the application 12 sends the printing job (JDF+PDL) to the DFE 32.

In step S2, the job receiving unit 51 outputs the printing job (JDF+PDL) to the system controlling unit 52.

In step S3, the system controlling unit 52 stores the printing job in the job data storage unit 53 in a case where the DFE 32 is set to store the printing job in the job data storage unit 53.

In step S4, the system controlling unit 52 outputs the printing job to the job controlling unit 55 in a case where the DFE 32 is set to output the printing job to the job controlling unit 55.

In step S5, the job controlling unit 55 outputs the JDF with a JDF conversion request to the JDF analyzing unit 56.

In steps S6-S8, the JDF analyzing unit 56 determines the application 12 having created the JDF, thereby creating the "Job Attribute in DFE" using the conversion table for the RIP engine expected by the application 12 to perform rendering.

In a case where a RIP engine 59 is hardly determined, the JDF analyzing unit 56 creates the "Job Attribute in DFE" using all of the conversion tables. In the present embodiment, the "Job Attribute in DFE"s are created based on the respective conversion tables of "A", "B", and "C".

In step S9, the JDF analyzing unit 56 creates the "Job Attribute in DFE" based on the conversion table of "A".

In step S10, the JDF analyzing unit 56 creates the "Job Attribute in DFE" based on the conversion table of "B".

In step S11, the JDF analyzing unit 56 creates the "Job Attribute in DFE" based on the conversion table of "C".

In step S12, the JDF analyzing unit 56 outputs the "Job Attribute in DFE" with the "Parameter Error Information" to the job controlling unit 55.

In a case where a RIP engine 59 is determined in step S6-S8, only one "Job Attribute in DFE" is output, while in a case where a RIP engine 59 is not determined, three "Job Attribute in DFE"s with the respective "Parameter Error Information"s are output.

In step S13, when receiving the parameter error information, the job controlling unit 55 outputs the parameter error information to the system controlling unit 52.

In step S14, the system controlling unit 52 stores the printing job with the parameter error information in the job data storage unit 53. That is, in a case where the DFE 32 does not include a RIP engine 59 which can handle the printing job, the information to indicate errors is recorded without proceeding with the printing job. Therefore, the user knows the reason why the printing job of "D" is not proceeding to be printed.

In step S14, when receiving only the "Job Attribute in DFE" (not receiving the parameter error information), the job controlling unit 55 creates the "RIP Parameter List" based on the "Job Attribute in DFE" and the PDL.

Processes described below differ according to the "RIP Control Mode", which may be the "Page Mode" or the "Sheet Mode". First, a case of the "Page Mode" is described.

In step S15, when the RIP engine 59 is determined, the job controlling unit 55 creates the "RIP Parameter List" based on the "Job Attribute in DFE" and the PDL.

In step S16-1, the job controlling unit 55 outputs the "RIP Parameter List" to the RIP controlling unit 58.

In step S17-1, the RIP controlling unit 58 initializes the RIP engines 59.

In step S18-1, the job controlling unit 55 requests the RIP controlling unit 58 to execute RIP.

In step S19-1, the RIP controlling unit 58 outputs the RIP commands instead of the job controlling unit 55. The RIP controlling unit 58 outputs the RIP commands in a sequence suitable for the "Page Mode" in a case where the "RIP Control Mode" is the "Page Mode".

In step S20-1, the RIP engine 59 rasterizes.

In step S21-1, the RIP engine 59 stores the raster data in the image storage unit 60.

Next, a case of the "Sheet Mode" is described.

In step S16-2, the job controlling unit 55 outputs the "RIP Parameter List" to the RIP controlling unit 58.

In step S17-2, the RIP controlling unit 58 initializes the RIP engine 59.

In step S18-2, the job controlling unit 55 requests the RIP controlling unit 58 to execute RIP.

In step S19-2, the RIP controlling unit 58 outputs the RIP commands in a sequence suitable for the "Sheet Mode" in a case where the "RIP Control Mode" is the "Sheet Mode".

In step S20-2, RIP engine 59 rasterizes.

In step S21-2, the RIP engine 59 stores the raster data in the image storage unit 60.

Thus, operation of the job controlling unit 55 in the case of the "Sheet Mode" does not differ from that of the "Page mode" (always be operated according to the "Page Mode"). The RIP controlling unit 58, based on the "RIP Control Mode", determines the differences between the "Page Mode" and the "Sheet Mode", thereby absorbing the differences between the "Page Mode" and the "Sheet Mode".

In step S22, the job controlling unit 55 outputs the "Finishing Information" with a print execution request to the printer controlling unit 61. This may be performed before creating the raster data or after creating the raster data.

In step S23, the printer controlling unit 61, receiving the print execution request, checks the raster data stored in the image storage unit 60 to print.

Figure 21:
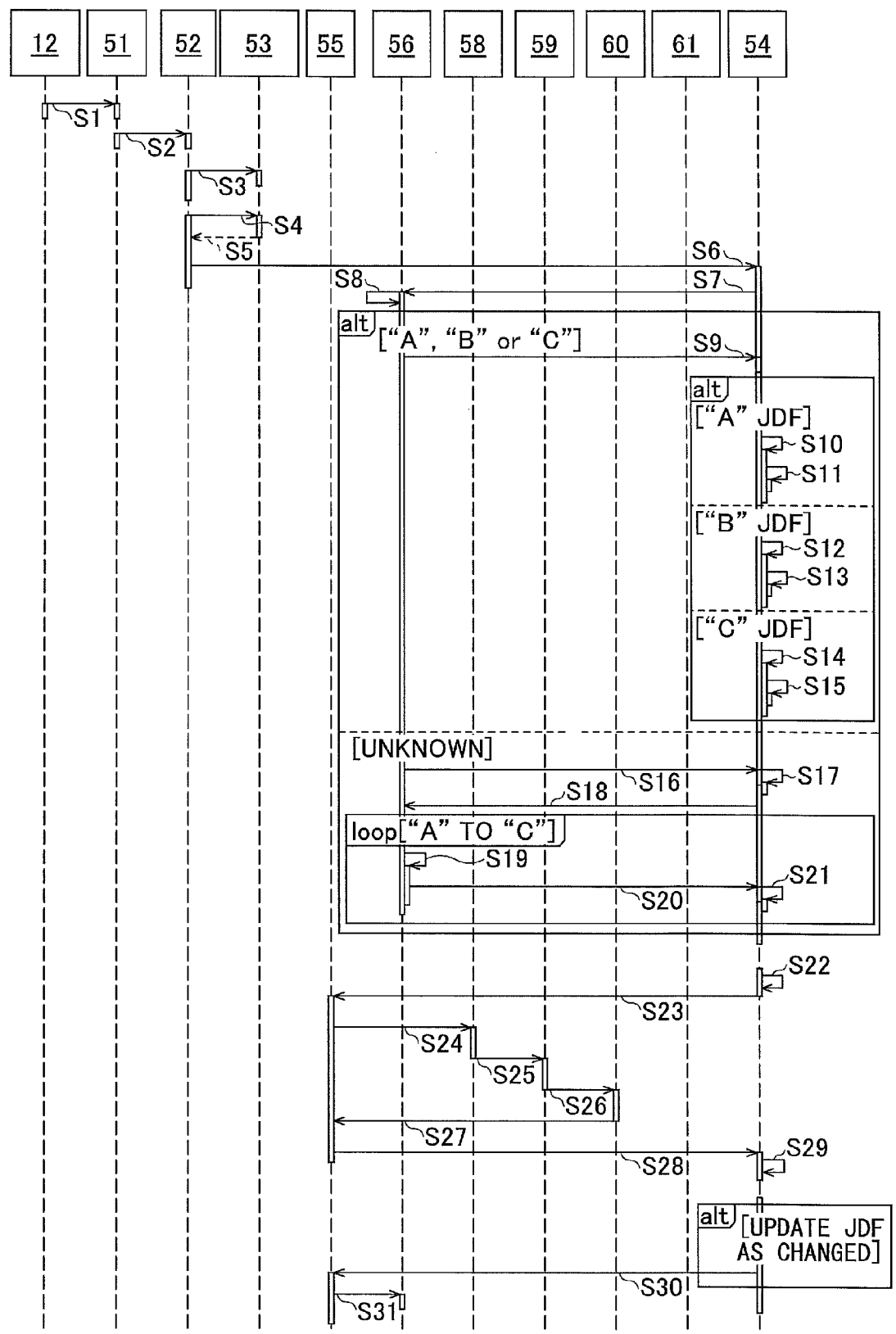
FIG. 21 is a sequence diagram illustrating the operation flow of the DFE to display the printing job stored in the job data storage unit.

FIG. 21 is a sequence diagram illustrating the operation flow of the DFE 32 to display the printing job stored in the job data storage unit 53.

In step S1, the application 12 sends the printing job (JDF+PDL) to the DFE 32.

In step S2, the job receiving unit 51 outputs the printing job (JDF+PDL) to the system controlling unit 52.

In step S3, the system controlling unit 52 stores the printing job in the job data storage unit 53. It is predetermined whether the printing job is stored in the job data storage unit 53 or output to the system controlling unit 52.

Then, the user operates the DFE 32 to display the printing job stored in the job data storage unit 53 on the display 330.

In step S4, the system controlling unit 52 requests the job data storage unit 53 to find the printing job, according to the user operation.

In step S5, the system controlling unit 52 retrieves the JDF of the specified printing job from the job data storage unit 53.

In step S6, the system controlling unit 52 outputs the JDF with a display request of the JDF (printing job) to the UI controlling unit 54.

In step S7, the UI controlling unit 54 outputs the JDF with a analysis request to the JDF analyzing unit 56.

In step S8, the JDF analyzing unit 56 determines for which RIP engine the JDF has been created with reference to the extended tags.

In step S9, in a case where the RIP engine 59 is determined, the JDF analyzing unit 56 outputs the determination result of the RIP engine 59 to the UI controlling unit 54.

In the following, any one combination of steps S10 and S11, S12 and S13, or S14 and S15 is performed.

In step S10, the "A" UI controlling unit 62a displays the setting screen of "A" in a case where the JDF is for the RIP engine 59 of "A".

In step S11, setting or selection of the values of the attributes selected by the user is accepted.

In step S12, the "B" UI controlling unit 62b displays the setting screen of "B" in a case where the JDF is for the RIP engine 59 of "B".

In step S13, setting or selection of the values of the attributes selected by the user is accepted.

In step S14, the "B" UI controlling unit 62c displays the setting screen of "C" in a case where the JDF is for the RIP engine 59 of "C".

In step S15, setting or selection of the values of the attributes selected by the user is accepted.

In step S16, in a case where the RIP engine 59 is not determined, the JDF analyzing unit 56 outputs the determination result (unknown) of the RIP engine to the UI controlling unit 54.

In step S17, when the UI controlling unit 54 receives the determination result (unknown), the individual UI controlling unit 63 displays the individual setting screens shown in FIGS. 16A-16C.

Screens displayed in the following processes differ by the user operation. For example, a case where the user presses the button 604 will be described.

In step S18, when the user presses the button 604, the UI controlling unit 54 outputs the JDF and sends a request for creation of the parameter error information to the JDF analyzing unit 56. Steps S19 to S21 described below are repeatedly performed corresponding to the number of the RIP engines in the RIP engines 59.

In step S19, the JDF analyzing unit 56 creates the parameter error information corresponding to the respective RIP engines 59.

In step S20, the JDF analyzing unit 56 outputs the created parameter information to the UI controlling unit 54.

In step S21, the individual UI controlling unit 63 in the UI controlling unit 54 displays the parameter error information screen shown in FIG. 19. Thus, the user recognizes which values of the attributes are omitted.

In step S22, in a case where the user presses the button 603, the preview screen shown in FIG. 18 is displayed.

In step S23, the UI controlling unit 54 outputs a preview display request to the job controlling unit 55.

In step S24, the job controlling unit 55, receiving the printing job from the system controlling unit, creates the "RIP Parameter List" based on the "Job Attribute in DFE" created with the conversion tables of "A", "B", and "C", and the PDL. Further, the job controlling unit 55 outputs the RIP execution request to the RIP controlling unit 58.

In step S25, the RIP controlling unit 58 outputs the RIP execution request to the RIP engine 59.

In step S26, the RIP engine 59 of "A", the RIP engine 59 of "B", and the RIP engine 59 of "C" respectively create the raster data to store in the image storage unit 60.

In step S27, the job controlling unit 55 retrieves the respective raster data from the image storage unit 60.

In step S28, the job controlling unit 55 outputs the respective raster data to the UI controlling unit 54.

In step S29, the individual UI controlling unit 63 creates and displays the preview screen on the display 330 with the page image of the raster data.

In step S30, when the user operates on the individual setting screen to update the JDF as changed, the individual UI controlling unit 63 accepts it, thereby outputting the JDF with a storage request of the printing job to the system controlling unit 52.

In step S31, the system controlling unit 52 stores the PDL and the JDF in the job data storage unit 53.

As described above, the DFE 32 of the present embodiment displays the JDF with the individual setting screens in a case where any of the RIP engines 59 cannot appropriately handle the printing job. Therefore, the user can confirm whether the content of the JDF is shown in the setting screen and can change the content of the JDF. Further, since the omitted attributes are displayed as the parameter error information, the user can recognize the difference from the desired finishing appearance or whole image of the desired finished appearance. Also, the preview screen is helpful for the user to visually recognize the finished appearance.

Second Embodiment

Although, in the first embodiment, the user directly operates the DFE 32 to change the JDF, in the DFE 32 of the present embodiment, the user operates the client PC 11 to change the JDF.

Figure 22:
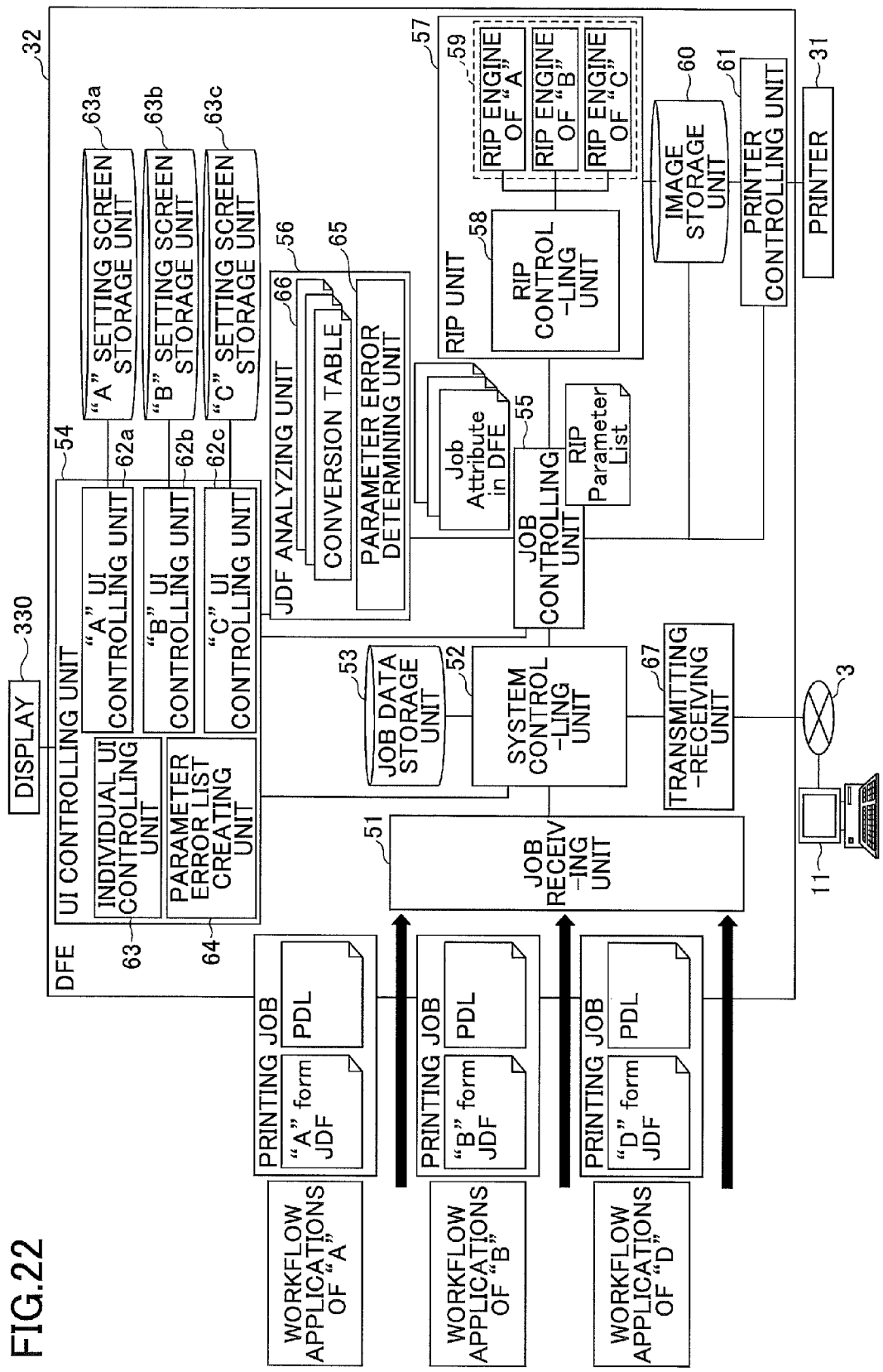
FIG. 22 is a block diagram illustrating an example of a functional configuration of the DFE of the present embodiment.

FIG. 22 is a block diagram illustrating an example of a functional configuration of the DFE 32 of the present embodiment. Additionally, an identical reference numeral will be applied to elements or the like that have similar functions and configurations to those shown in FIG. 6. Therefore, only important elements in the present embodiment may be described.

In the present embodiment, the DFE 32 includes a transmitting-receiving unit 67, and is connected with the client PC 11 rough the network 3. The client PC 11 is an example of an external device in the claims, forming a part of an information processing system.

The transmitting-receiving unit 67 transmits, as a server, the setting screen and the individual setting screens responsive to the communication request from the client PC 11. The setting screens are described in HTML, XML, JavaScript, etc., and a browser or a certain application in the client PC 11 displays the setting screens.

The user can request to send the setting screen, by operating the client PC 11, to the DFE 32 in such a configuration. For example, in a case where the user requests a list of the printing jobs to select a desired job, the transmitting-receiving unit 67 lets the system controlling unit 52 (or the UI controlling unit 54, or the like) determine for which RIP engine the printing job has been created. The system controlling unit 52 lets the UI controlling unit 54 determine for which RIP engine the printing job has been created.

In a case where the RIP engine 59 is determined, the UI controlling unit 54 retrieves the setting screen from the "A" setting screen storage unit 63a, the "B" setting screen storage unit 63b, or the "C" setting screen storage unit 63c to output it to the transmitting-receiving unit 67. In a case where the RIP engine 59 is not determined, the individual setting screens are output to the transmitting-receiving unit 67.

The transmitting-receiving unit 67 transmits the setting screen and the JDF, or the individual setting screens and the JDF to the client PC 11. In a case where the client PC 11 receives the setting screen and the JDF, the user can check the content of the printing job, or change the values of the attributes and transmit to the DFE 32. In a case where the client PC 11 receives the individual setting screens and the JDF, the user can check the content of the printing job with the individual setting screens, or display the preview screen or the parameter error information screen through the individual setting screens.

Also, the user can change the values of the attributes and transmit to the DFE 32.

Figure 23:
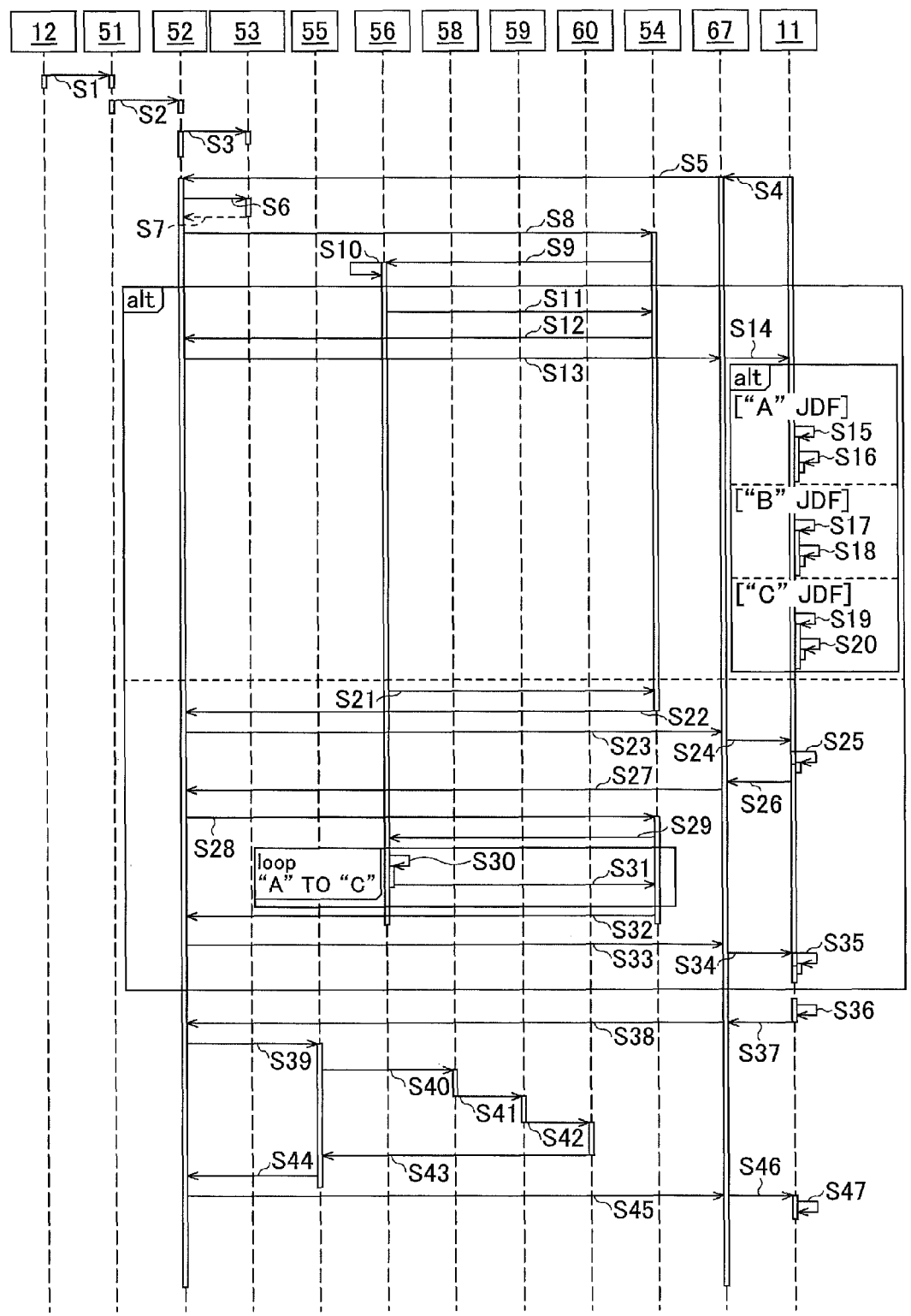
FIG. 23 is a sequence diagram illustrating the operation flow of the client PC to process the printing job.

FIG. 23 is a sequence diagram illustrating the operation flow of the client PC 11 to display the printing job. The processes in steps S1-S3 are the same as those shown in FIG. 21.

The user operates the client PC 11 to receive a list of the printing jobs stored in the job data storage unit 53 from the DFE 32, thereby displaying it on the display 330 to select an arbitrary printing job.

In step S4, the client PC 11 requests the transmitting-receiving unit 67 to transmit the JDF included in the selected printing job.

In step S5, the transmitting-receiving unit 67 outputs a JDF request to the system controlling unit 52.

In step S6, the system controlling unit 52 requests the job data storage unit 53 to find the printing job.

In step S7, the system controlling unit 52 retrieves the JDF of the specified printing job from the job data storage unit 53.

In step S8, the system controlling unit 52 outputs the JDF with a display request of the JDF (printing job) to the UI controlling unit 54.

In step S9, the UI controlling unit 54 outputs the JDF with an analysis request to the JDF analyzing unit 56.

In step S10, the JDF analyzing unit 56 determines for which RIP engine the JDF has been created with reference to the extended tags.

In step S11, in a case where the RIP engine 59 is determined, the JDF analyzing unit 56 outputs the determination result of the RIP engine 59 to the UI controlling unit 54.

In step S12, in a case where the RIP engine 59 is determined, the UI controlling unit 54 outputs, according to the determination result, any one of the setting screens of "A", "B" or "C" to the system controlling unit 52.

In step S13, the system controlling unit 52 outputs the setting screen and the JDF to the transmitting-receiving unit 67.

In step S14, the transmitting-receiving unit 67 transmits the setting screen and the JDF to the client PC 11.

The processes performed in a combination of steps S15 and S16, S17 and S18 or S19 and S20 are the same as those in FIG. 21.

In step S21, in a case where the RIP engine 59 is not determined, the JDF analyzing unit 56 outputs the determination result (unknown) of the RIP engine to the UI controlling unit 54.

In step S22, the UI controlling unit 54 outputs the individual setting screens and the JDF to the system controlling unit 52 since the determination results indicates unknown.

In step S23, the system controlling unit 52 outputs the individual setting screens and the JDF to the transmitting-receiving unit 67.

In step S24, the transmitting-receiving unit 67 transmits the individual setting screens and the JDF to the client PC 11.

In step S25, the client PC 11 displays the individual setting screens.

In step S26, for example, in a case where the user presses the button 604, the client PC 11 requests the transmitting-receiving unit 67 to create the parameter error information.

In step S27, the transmitting-receiving unit 67 outputs a creation request of the parameter error information to the system controlling unit 52.

In step S28, the system controlling unit 52 outputs the creation request of the parameter error information to the UI controlling unit 54.

Steps S29 to S31 described below are repeatedly performed corresponding to the number of the RIP engines in the RIP engines 59.

In step S29, the UI controlling unit 54 outputs the creation request of the parameter error information to the JDF analyzing unit 56.

In step S30, the parameter error determining unit 65 in the JDF analyzing unit 56 creates the parameter error information corresponding to the respective RIP engines 59.

In step S31, the JDF analyzing unit 56 outputs the created parameter error information to the UI controlling unit 54.

In step S32, the UI controlling unit 54 outputs the created parameter error information to the system controlling unit 52.

In step S33, the system controlling unit 52 outputs the parameter error information to the transmitting-receiving unit 67.

In step S34, the transmitting-receiving unit 67 transmits the parameter error information to the client PC 11.

In step S35, the client PC 11 displays the parameter error information screen. Thus, the user can recognize which values of the attributes are omitted.

In a case where the user presses the button 603, the preview screen is displayed.

In step S36, the client PC 11 accepts the operation for displaying the preview screen.

In step S37, the client PC 11 sends a display request for the preview screen to the transmitting-receiving unit 67.

In step S38, the transmitting-receiving unit 67 outputs the display request for the preview screen to the system controlling unit 52.

In step S39, the system controlling unit 52 outputs the display request for the preview screen to the job controlling unit 55.

In step S40, the job controlling unit 55, receiving the printing job from the system controlling unit, creates the "RIP Parameter List" based on the "Job Attribute in DFE" created with the conversion tables of "A", "B", and "C", and the PDL. Further, the job controlling unit 55 outputs the RIP execution request to the RIP controlling unit 58.

In step S41, the RIP controlling unit 58 outputs the RIP execution request to the RIP engines 59.

In step S42, the RIP engine 59 of "A", the RIP engine 59 of "B", and the RIP engine 59 of "C" respectively create the raster data to store in the image storage unit.

In step S43, the job controlling unit 55 retrieves the respective raster data from the image storage unit.

In step S44, the job controlling unit 55 outputs the respective raster data to the system controlling unit 52.

In step S45, the system controlling unit 52 outputs the respective raster data to the transmitting-receiving unit 67.

In step S46, the transmitting-receiving unit 67 transmits the respective raster data to the client PC 11.

In step S47, the client PC 11 displays the preview screen.

Thus, in the present embodiment where the user operates the client PC 11, similarly to the first embodiment, the attributes omitted in the respective setting screens can be displayed and the preview screen can be displayed.

[Suitable Variations]

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

For example, although the DFE 32 has all the functions in FIG. 6, these functions may be distributed to separate devices which can communicate with each other through the network 3. For example, the RIP engines 59 and the JDF analyzing unit 56 may be disposed in the network which can be accessed by the DFE 32.

Similarly, the image storage unit 60 or the job data storage unit 53 may be disposed in the network which can be accessed by the DFE 32.

Further, the "A" setting screen storage unit 63a, the "B" setting screen storage unit 63b, and the "C" setting screen storage unit 63c, for storing the respective setting screens may be disposed externally. In this case, the DFE 32 receives the setting screens from the external "A" setting screen storage unit 63a, the "B" setting screen storage unit 63b, and the "C" setting screen storage unit 63c.

The present application is based on Japanese Priority Application No. 2014-035912 filed on Feb. 26, 2014, and Japanese Priority Application No. 2015-026696 filed on Feb. 13, 2015, the entire contents of which are hereby incorporated herein by reference.

What is claimed is:

1. An information processing apparatus for creating drawing data based on a printing job, comprising:
   a plurality of drawing data creating units configured to create respective drawing data based on the printing job;
   a determining unit configured to determine, through an analysis of the printing job, a drawing data creating unit from the drawing data creating units to create a drawing datum based on the printing job; and
   a screen displaying unit configured to display, in respective manners, a content of the printing job with a plurality of display screens associated with the drawing data creating units, in a case where the determining unit fails to select any one of the drawing data creating units.

2. The information processing apparatus as claimed in claim 1, wherein the screen displaying unit displays the printing job with the display screens associated with the drawing data creating units, and switches displaying from one of the display screens to another of the display screens, when accepting a switching operation.

3. The information processing apparatus as claimed in claim 1, wherein
   the printing job includes printing data and setting information,
   selectable setting values in the setting information are predetermined according to the drawing data creating units and setting items in the printing job,
   and the screen displaying unit converts the setting values in the setting information into setting values respectively selectable in the drawing data creating units.

4. The information processing apparatus as claimed in claim 1, further comprising: a setting difficulty information creating unit configured to determine whether setting values are settable or not, corresponding to the drawing data creating units, to detect the setting values not settable, thereby creating setting difficulty information; wherein
   the printing job includes printing data and setting information,
   selectable setting values in the setting information are predetermined according to the drawing data creating units and setting items in the printing job, and the screen displaying unit displays the setting difficulty information corresponding to the drawing data creating units.

5. The information processing apparatus as claimed in claim 1, wherein
the screen displaying unit further displays the drawing data which are respectively created by the drawing data creating units based on the printing job.

6. The information processing apparatus as claimed in claim 5, wherein the screen displaying unit displays images which are created by performing a finishing process on the drawing data respectively created by the drawing data creating units, when the finishing process to be performed on the drawing data is included in the content of the printing job.

7. An information processing apparatus for creating drawing data based on a printing job, comprising:
a plurality of drawing data creating units configured to create respective drawing data based on the printing job;
a determining unit configured to determine, through an analysis of the printing job, a drawing data creating unit from the drawing data creating units to create a drawing datum based on the printing job; and
a screen displaying unit configured to display, in respective manners, a content of the printing job with a plurality of display screens associated with the drawing data creating units, in a case where the determining unit fails to select any one of the drawing data creating units; and
a screen transmitting unit configured to transmit the plurality of display screens to an external apparatus.

8. A non-transitory computer-readable recording medium having stored therein a program for causing a computer to serve as an information processing method which creates respective drawing data based on a printing job by using one or more drawing data creating units, the information processing method performing the steps of:
determining, through an analysis of the printing job, a drawing data creating unit from the drawing data creating units to create a drawing datum based on the printing job; and
displaying, in respective manners, a content of the printing job with a plurality of display screens associated with the drawing data creating units, in a case where the determining fails to select any one of the drawing data creating units.

* * * * *